(12) United States Patent
Ito et al.

(10) Patent No.: US 7,281,916 B2
(45) Date of Patent: Oct. 16, 2007

(54) TIRE VULCANIZING SYSTEM AND TIRE MANUFACTURING METHOD TO BE USED THEREFOR

(75) Inventors: Taizo Ito, Kodaira (JP); Akio Obayashi, Kodaira (JP); Masayuki Ichinose, Kodaira (JP); Toshiyuki Horie, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 269 days.

(21) Appl. No.: 10/486,381

(22) PCT Filed: Aug. 9, 2002

(86) PCT No.: PCT/JP02/08200

§ 371 (c)(1),
(2), (4) Date: Feb. 10, 2004

(87) PCT Pub. No.: WO03/013818

PCT Pub. Date: Feb. 20, 2003

(65) Prior Publication Data

US 2004/0234637 A1    Nov. 25, 2004

(30) Foreign Application Priority Data

| Aug. 10, 2001 | (JP) | ............................. 2001-243409 |
| Aug. 10, 2001 | (JP) | ............................. 2001-243410 |
| Aug. 15, 2001 | (JP) | ............................. 2001-246459 |
| Aug. 15, 2001 | (JP) | ............................. 2001-246461 |
| Aug. 15, 2001 | (JP) | ............................. 2001-246462 |
| Aug. 15, 2001 | (JP) | ............................. 2001-246520 |
| Sep. 19, 2001 | (JP) | ............................. 2001-284714 |
| Sep. 19, 2001 | (JP) | ............................. 2001-284715 |

(51) Int. Cl.
   *B29C 35/02* (2006.01)

(52) U.S. Cl. ........................ 425/34.1; 425/38; 425/195

(58) Field of Classification Search .................. 425/29, 425/34.1, 38, 195
See application file for complete search history.

(56) References Cited

U.S. PATENT DOCUMENTS

| 1,900,456 | A | * | 3/1933 | Mead ........................ 425/34.1 |
| 3,477,100 | A | * | 11/1969 | Pech et al. ................. 425/34.1 |
| 4,773,810 | A | | 9/1988 | Nishimura et al. |
| 5,165,939 | A | | 11/1992 | Pizzorno |
| 5,631,028 | A | * | 5/1997 | Mizokawa et al. ........ 425/34.1 |
| 5,656,303 | A | | 8/1997 | Takagi |
| 5,683,726 | A | | 11/1997 | Mitamura |
| 5,746,964 | A | | 5/1998 | Ureshino et al. |
| 6,196,819 | B1 | | 3/2001 | Mitamura |
| 6,338,620 | B1 | | 1/2002 | Yamada |
| 6,461,134 | B1 | * | 10/2002 | Ito et al. .................... 425/34.1 |
| 6,702,912 | B1 | * | 3/2004 | Oku et al. ................. 425/34.1 |
| 6,719,549 | B1 | * | 4/2004 | Mitamura .................. 425/34.1 |

FOREIGN PATENT DOCUMENTS

| EP | 0 459 375 | 12/1991 |
| EP | 0 520 253 | 12/1992 |

(Continued)

*Primary Examiner*—James P. Mackey
(74) *Attorney, Agent, or Firm*—Oliff & Berridge, PLC

(57) ABSTRACT

A vulcanizing system including a tire transferring apparatus or a mold opening/closing station arranged equidistantly to a plurality of vulcanizing stations, thereby achieving a reduced equipment cost and a reduced installation space with a higher manufacturing efficiency.

12 Claims, 23 Drawing Sheets

FOREIGN PATENT DOCUMENTS

| | | |
|---|---|---|
| EP | 0 684 126 | 11/1995 |
| EP | 0 727 296 | 8/1996 |
| EP | 0 922 561 | 6/1999 |
| EP | 1 002 632 | 5/2000 |
| EP | 1 090 729 | 4/2001 |
| EP | 1 092 530 | 4/2004 |
| JP | A-62-253410 | 11/1987 |
| JP | A 06-071651 | 3/1994 |
| JP | A 8-281655 | 10/1996 |
| JP | A-08-300357 | 11/1996 |
| JP | A 09-048026 | 2/1997 |
| JP | A 11-245229 | 9/1999 |
| JP | A 11-254444 | 9/1999 |

\* cited by examiner

FIG. 17
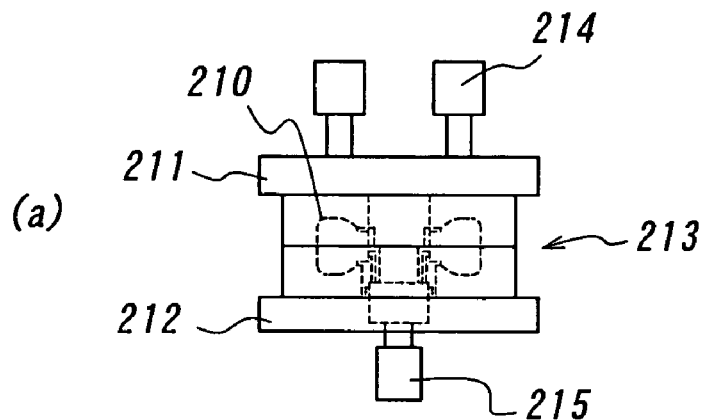
(a)
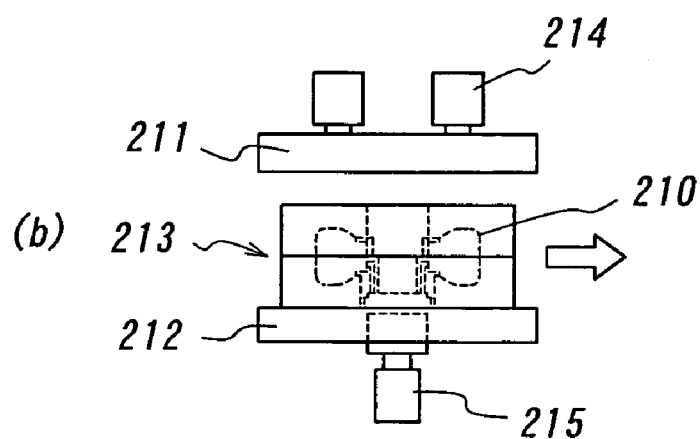
(b)
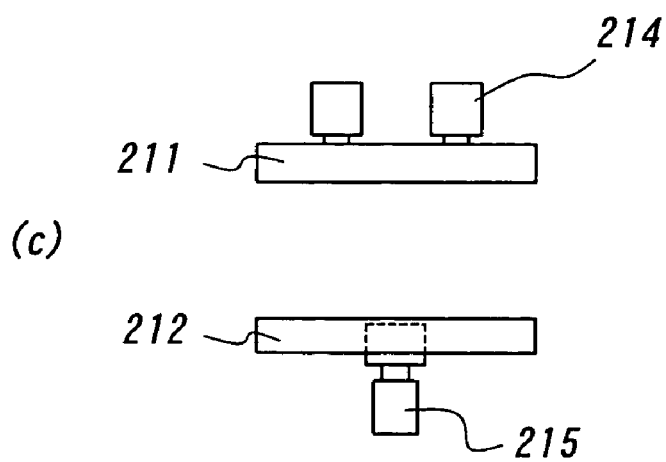
(c)

FIG. 23
(a)
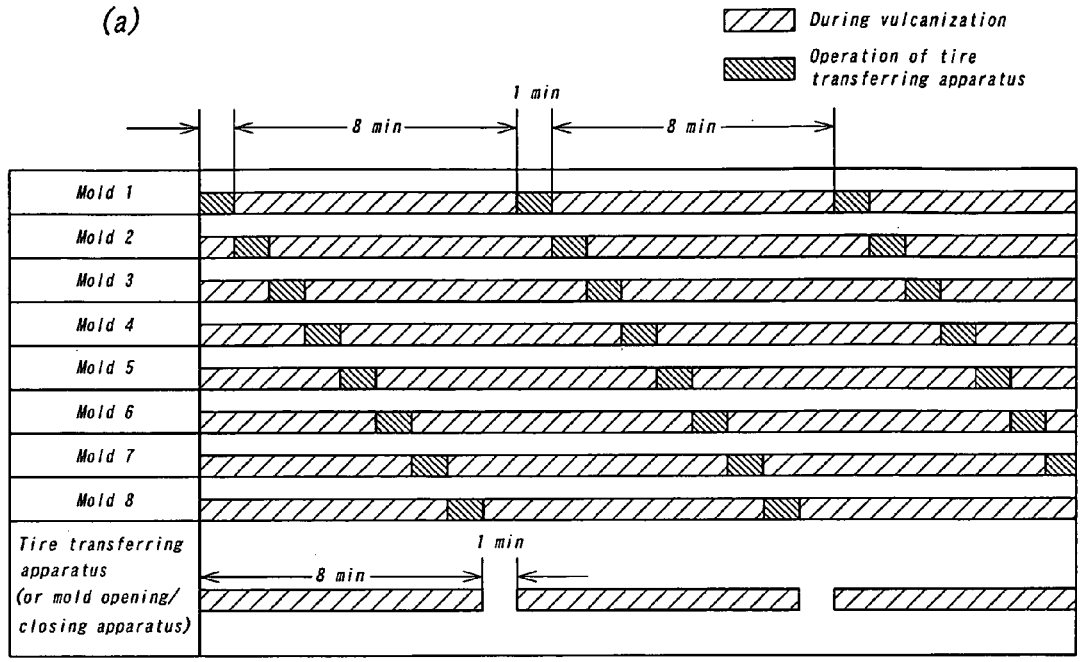
(b)
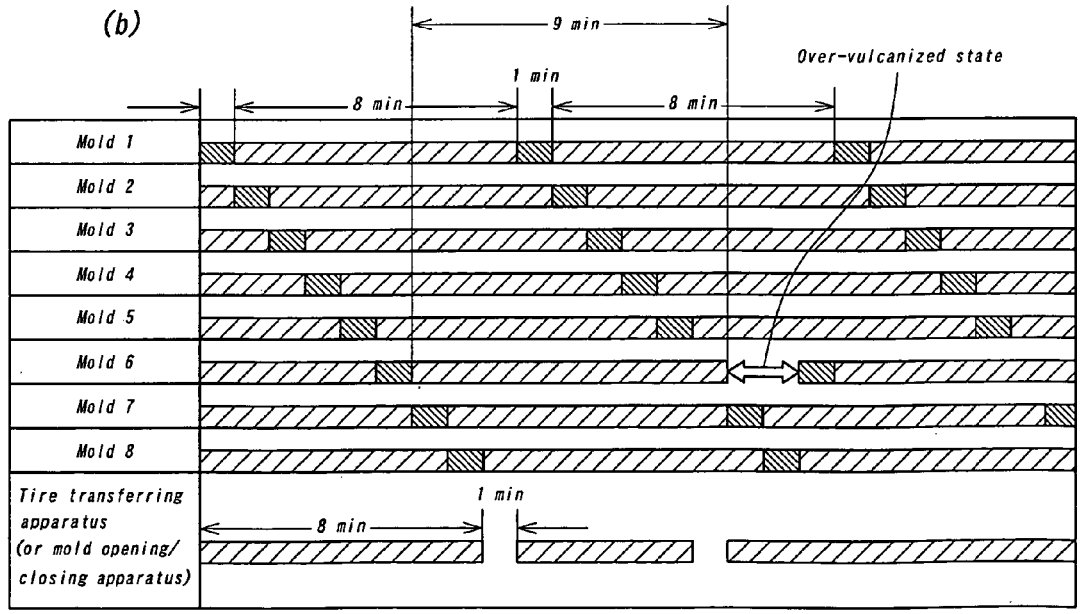

TIRE VULCANIZING SYSTEM AND TIRE MANUFACTURING METHOD TO BE USED THEREFOR

TECHNICAL FIELD

The present invention relates to an improvement of a tire vulcanizing system, and particularly to a system having a plurality of vulcanizing stations and a tire manufacturing method applicable thereto capable of reducing an equipment cost and an installation space.

BACKGROUND ART

As a tire vulcanizing equipment, there has been conventionally and widely used a vulcanizing apparatus 311 as illustrated in a schematic front view of FIG. 21. Although the apparatus 311 is provided with two pairs of vulcanizing molds 312 and these vulcanizing molds 312 are actually operated in a mutually synchronized manner, the left half of the drawing illustrates a state where the associated vulcanizing mold 312 is about to accommodate therein a green tire 313 and the right half illustrates a state where a vulcanized tire 314 is being taken out of the associated vulcanizing mold 312.

In this apparatus 311, both of the vulcanizing molds 312 are arranged within a plane in postures where central axes of the tires 313, 314 become vertical, thereby allowing two tires to be simultaneously vulcanized at once.

In addition to the vulcanizing molds 312 each comprising upper and lower mold-pieces 312A, 312B, this apparatus 311 includes: mold opening/closing means 317 for opening and closing the molds 312 by displacing an upper platen 316 and the upper mold-piece 312A upward and downward relative to a lower platen 315; and carrying in/out means (not shown) for delivering the green tire 313 into the apparatus, and for taking the vulcanized tire 314 out of the apparatus, for example; so that the apparatus 311 is constitutionally adaptable to various producing situations.

Although the production ability of tires is to be determined by the number of installed sets of such apparatuses 311, there is a recent tendency that the vulcanizing time is extended such as with reduced lots of many types of tires, large-sized tires, and higher performance of tires in addition to a tendency of increased production amount of tires, thereby obliging the number of sets of apparatuses 311 to be further increased to deal with both of the above tendencies.

Under such circumstances, it is strongly desired to develop a tire vulcanizing system capable of dealing with both of the above tendencies by a reduced installation space and a lower equipment cost under the restrictions of an installation space of apparatuses and of an equipment cost, as compared with a situation where many sets of the above-mentioned apparatuses 311 are simply arranged within a plane.

In view of the above, JP-A-9-48026 has proposed a tire vulcanizing apparatus in which vulcanizers are constituted by arranging a plurality of molds in postures where central axes of tires are horizontally oriented, and one mold opening/closing apparatus is provided correspondingly to four molds, thereby contemplating a reduced installation space and a reduced equipment cost. However, this proposal is also to move the mold opening/closing apparatus to a position corresponding to each vulcanizer so as to take a mold into and out of the corresponding vulcanizer at each position and to eject a vulcanized tire from the mold and set a green tire into the mold, in a manner to require a space for moving the mold opening/closing apparatus itself and a moving apparatus therefor as well as a space and an apparatus for temporarily placing vulcanized tires and green tires at respective moved positions, thereby failing to sufficiently lower the installation cost.

Moreover, since the moving times of the mold opening/closing apparatuses between the respective vulcanizers are different depending on the positions of the vulcanizers in the above proposed tire vulcanizing apparatus, it is required to determine a vulcanizing cycle on the basis of a period of time during which the mold opening/closing apparatus moves between the most separated two vulcanizers, thereby resulting in an extended cycle time and a deteriorated throughput per unit time.

It is therefore an object of the present invention to provide a tire vulcanizing system capable of remarkably increasing a productivity while sufficiently and exemplarily dealing with various vulcanizing conditions, even with a reduced installation space and an effectively restricted equipment cost.

DISCLOSURE OF THE INVENTION

The present invention has been carried out to achieve the above object, and its essential points, constitution and operations will be described hereinafter.

(1)

The present invention provides a tire vulcanizing system comprising: a plurality of vulcanizing stations arranged on an arc within a plane and each including a vulcanizing mold and a local mold opening/closing apparatus, and one set of common vulcanizing-station-aimed tire transferring apparatus disposed at a central location of the arc and including a swiveling arm for loading a green tire into each vulcanizing mold and for unloading a vulcanized tire from each vulcanizing mold.

The term "arc" used herein is not limited to arcs in a strict sense, and embraces those curves analogous to arcs, and even such curves are capable of sufficiently achieving the intended object.

According to the above, the one set of vulcanizing-station-aimed tire transferring apparatus is commonly used for the plurality of vulcanizing stations, thereby enabling an advantageously reduced equipment cost as compared with the related art for providing dedicated tire carrying-in/out means for each vulcanizing station.

Further, the vulcanizing-station-aimed tire transferring apparatus of a swiveling arm type is arranged at the central location of the plurality of vulcanizing stations disposed on the arc such that the tire transferring apparatus is positioned substantially equidistantly to all of the vulcanizing stations, thereby enabling an effectively reduced occupying space of the vulcanizing system as well as a shortened inoperative time of the vulcanizing-station-aimed tire transferring apparatus such as accompanying to running and positioning/stopping of the transferring apparatus relative to the vulcanizing stations, thereby enabling corrections of various operational precisions not to be required accompanying to the movement of the transferring apparatus over a long distance, and thereby enabling carrying in/out distances of green tires and vulcanized tires relative to the vulcanizing stations to be brought into extremely shortened equal distances, to thereby allow a remarkably improved production efficiency.

Further, in this system, the carrying in/out operations of tires can be conducted only within the arc connecting the vulcanizing stations while conducting other set-up operations such as exchange of vulcanizing molds outside the arc, so that the respective operation spaces are functionally separated from one another and the respective operations can be independently conducted without mutual interference, thereby also advantageously improving the production efficiency.

Moreover, it is also possible in this vulcanizing system to provide a bladder attaching/detaching mechanism for each vulcanizing station, and in this way, it is exemplarily possible to automatically attach a bladder to a green tire loaded into the vulcanizing mold and to automatically detach the bladder from a vulcanized tire upon taking the tire out of the vulcanizing mold, thereby making it unnecessary to attach a bladder internally to a tire existent outside the vulcanizing mold, to thereby enable the minimized absolute number of bladders themselves.

On the contrary, it is also possible to detach a bladder, having been previously attached to a green tire outside the vulcanizing system, from a vulcanized tire outside the vulcanizing system, and this is also true in a situation where a green tire formed on a rigid core which can be disassembled and having an outer surface shape corresponding to an inner surface shape of a product tire is loaded into the vulcanizing mold together with the rigid core. This enables an advantageously shortened cycle time during a period from the time when a green tire is carried into the vulcanizing station to the time when the vulcanized tire is carried out of it.

(2)

The tire vulcanizing system according to the invention described in (1), further comprises: a bladder attaching/detaching station disposed within a working area of the vulcanizing-station-aimed tire transferring apparatus and provided with a bladder attaching/detaching apparatus for attaching a bladder to a green tire and for detaching a bladder from a vulcanized tire.

In this system, the bladder attaching/detaching station provided with the bladder attaching/detaching apparatus for attaching/detaching a bladder to/from a tire is disposed within the working area of the tire transferring apparatus so as to attach a bladder to a green tire just before loading into the vulcanizing mold while immediately detaching the bladder from the tire just after vulcanization and taken out of the vulcanizing mold, thereby enabling a remarkably reduced number of required and prepared bladders as compared with a situation where bladders are previously attached to many green tires before loading into vulcanizing molds and the detachment of bladders from vulcanized tires is conducted when a considerable time has lapsed after the tires have been taken out of vulcanizing molds, respectively, while enabling an advantageously reduced total occupying space and equipment cost for the system as compared with a situation where dedicated bladder attaching/detaching apparatuses are provided for the vulcanizing stations, respectively.

(3)

The tire vulcanizing system according to the invention described in (1) or (2), further comprises: a post-vulcanization treatment station disposed within a working area of the vulcanizing-station-aimed tire transferring apparatus and for applying a post-vulcanization treatment (hereinafter called "PCI") to a vulcanized tire taken out of each vulcanizing mold.

According to this vulcanizing system, it is also possible to carry vulcanized tires into and out of the post-vulcanization treatment station by the one set of vulcanizing-station-aimed tire transferring apparatus, thereby enabling a further reduced equipment cost and installation space in addition to the above effects.

Note that when the above described bladder attaching/detaching station is provided in this vulcanizing system, vulcanized tires after application of PCI and still attached with bladders are to be carried into the bladder attaching/detaching station by the same vulcanizing-station-aimed tire. transferring apparatus, and bladders are detached from the tires at the bladder attaching/detaching station.

(4)

In the tire vulcanizing system according to the invention described in any one of (1) through (3), the tire transferring apparatus is constituted of an articulation type robot.

According to this tire vulcanizing system, there is utilized an existing robot as the tire transferring apparatus and the whole of the apparatus can be made to be sufficiently compact under operation of articulations upon disuse of the robot while robot's hands and the like can be reached sufficiently far positions, thereby enabling the respective vulcanizing stations around the tire transferring apparatus to be disposed closely to the transferring apparatus without a risk of interference with the transferring apparatus, to thereby enable realization of further reduced tire moving distances in addition to the reduced occupying space.

(5)

The tire vulcanizing system according to the invention described in any one of (1) through (4), further comprises: an incoming and outgoing station including: a green tire placing stand for receiving a green tire from the exterior of the system to thereby temporarily store the green tire there; and a vulcanized tire placing stand for temporarily storing a vulcanized tire and transferring it to the exterior of the system.

The incoming and outgoing station provided in the tire vulcanizing system is capable of functioning as a storing space for smoothly and exactly transferring the tires to those means inside and outside the vulcanizing system without deteriorating the timing.

(6)

In the tire vulcanizing system according to the invention described in (5), the incoming and outgoing station is disposed closely to the bladder attaching/detaching station; and the tire vulcanizing system further comprises at least one set of manipulator disposed between these stations and for transferring a tire to the respective stations.

In this vulcanizing system, the manipulator functions to smoothly and rapidly conduct transference of tires between these mutually neighbored incoming and outgoing station and bladder attaching/detaching station.

(7)

In the tire vulcanizing system according to the invention described in (6), the manipulator comprises a green-tire aimed manipulator for carrying a green tire into the bladder attaching/detaching station and a vulcanized-tire aimed manipulator for carrying a vulcanized tire out of the incoming and outgoing station, the manipulators being disposed between the incoming and outgoing station and the bladder attaching/detaching station.

According to this tire vulcanizing system, the functions of the green-tire aimed manipulator and vulcanized-tire aimed manipulator are separated from each other, thereby enabling predetermined transferring functions to be further improved, and thereby enabling a remarkably enhanced freedom degree of disposing positions of the incoming and outgoing station relative to the bladder attaching/detaching station.

(8)

The present invention further provides a tire vulcanizing system comprising: a plurality of vulcanizing stations arranged on an arc; a mold opening/closing station arranged at a center of this arc; mobile vulcanizing units to be reciprocatedly displaced between the associated vulcanizing stations and the mold opening/closing station, respectively; and a mold-opening/closing-station-aimed tire transferring apparatus for taking a tire into and out of the mold opening/closing station;

wherein each mobile vulcanizing unit is constituted to include a vulcanizing mold openable and closable in an axial direction of a tire;

wherein each vulcanizing station is provided with: a space for arranging therein the associated mobile vulcanizing unit during vulcanization of a tire; a heating-medium supplying port for supplying a heating medium for vulcanizing a tire; and a vulcanizing unit reciprocative driving apparatus for taking the mobile vulcanizing unit into and out of the mold opening/closing station; and wherein the mold opening/closing station is provided with a center mold opening/closing apparatus for opening and closing the vulcanizing mold of each mobile vulcanizing unit to thereby enable a tire to be taken into and out of the vulcanizing mold.

The term "arc" used herein is not limited to arcs in a strict sense, and embraces those curves analogous to arcs, and even such curves are capable of sufficiently achieving the intended object.

The vulcanizing system of the present invention is directed to reduce the installation space and equipment cost by installing one set of center mold opening/closing apparatus correspondingly to the plurality of vulcanizing stations in the same way as those disclosed in the above-mentioned JP-A-9-48026 while solving the problem existent in the conventional vulcanizing system, and thus the apparatuses for taking vulcanizing molds into and out of the mold opening/closing station are provided in the respective vulcanizing stations. Therefore, it is unnecessary for the center mold opening/closing apparatus in the tire vulcanizing system of the present invention to move toward those positions corresponding to the vulcanizing stations, respectively, so that the spaces and apparatuses for moving the center mold opening/closing apparatus are not required, thereby enabling an installation cost to be saved.

Further, the vulcanizing stations are arranged on the arc having its center at the mold opening/closing station, so that all of the vulcanizing stations can be fabricated in the same specifications irrespectively of the installed positions, thereby enabling a remarkably reduced equipment cost.

Moreover, the vulcanizing stations are arranged equidistantly to the mold opening/closing station, and the apparatus for taking molds into and out of the mold opening/closing station are provided at the vulcanizing station sides, thereby enabling every vulcanizing mold to be moved between the vulcanizing stations and the mold opening/closing station in the same period of time. This enables a fixed cycle time for vulcanization including takeout and delivery of any tire to be vulcanized in any mold insofar as the vulcanizing time is the same, thereby resultingly enabling a shortened cycle time and thus an improved throughput per unit time.

Further, in this system, the carrying in/out operations of tires can be conducted only within the arc connecting the vulcanizing stations while conducting other set-up operations such as exchange of vulcanizing molds outside the arc, so that the respective operation spaces are functionally separated from one another and the respective operations can be independently conducted without mutual interference, thereby also advantageously improving the production efficiency.

Moreover, it is also possible in this vulcanizing system to detach a bladder, having been previously attached to a green tire outside the vulcanizing system, from a vulcanized tire outside the vulcanizing system, and this is also true in a situation where a green tire formed on a rigid core which can be disassembled and having an outer surface shape corresponding to an inner surface shape of a product tire is loaded into the vulcanizing mold together with the rigid core. This enables an advantageously shortened cycle time during a period from the time when a green tire is carried into the vulcanizing station to the time when the vulcanized tire is carried out of it.

(9)

In the tire vulcanizing system according to the invention described in (8), each mobile vulcanizing unit is constituted to include, in addition to the vulcanizing mold: a heating platen portion to be heated by a heating medium and abutted on the vulcanizing mold to thereby transmit this heat to the vulcanizing mold; a heating-medium supplying hose for supplying the heating medium to the heating platen portion from the heating-medium supplying port; and mold locking means for clamping the vulcanizing mold to thereby detachably fix the vulcanizing mold to the heating platen portion; and the heating-medium supplying hose is constituted to keep a state connected to the mobile vulcanizing unit at any position between the vulcanizing station and the mold opening/closing station.

In this tire vulcanizing system, the heating platen portion exhibiting an essential function of the vulcanizer is moved integrally with the vulcanizing mold. This makes it unnecessary to take a vulcanizing mold into and out of the heating platen portion whenever a mold is taken into and out of the mold opening/closing station for opening and closing the mold, so that the equipment therefor is not required to thereby enable a reduced equipment cost.

Further, the heating-medium supplying hose can be moved in a state still connected to the mobile vulcanizing unit no matter where the mobile vulcanizing unit is positioned between the vulcanizing station and the mold opening/closing station, so that the vulcanization can be continued even during movement of the mobile vulcanizing unit, thereby enabling the cycle time to be shortened by maximally utilizing this movement time as a part of vulcanizing time. Further, it is unnecessary to separate the heating-medium supplying hose from the mobile vulcanizing unit whenever the mobile vulcanizing unit is moved to the mold opening/closing station, so that the equipment therefor is not required, thereby enabling a reduced equipment cost and a reduced risk of leakage of heating medium from the connecting portions.

(10)

In the tire vulcanizing system according to the invention described in (8) or (9), the vulcanizing unit reciprocative driving apparatus is constituted of: a vulcanizing unit driving part; and a vulcanizing unit supporting/guiding part fixedly disposed in a moving region of the mobile vulcanizing unit; the vulcanizing unit supporting/guiding part is provided with rollers having short axes and for supporting the mobile vulcanizing unit, which rollers are rotatable about horizontal axes perpendicular to a moving direction of the mobile vulcanizing unit; and the mobile vulcanizing unit is attached with rails parallelly to the moving direction of the mobile vulcanizing unit, which rails are interposed between the mobile vulcanizing unit and the rollers and move on the rollers.

According to this tire vulcanizing system, the vulcanizing unit supporting/guiding part of the vulcanizing unit reciprocative driving apparatus is constituted by providing rollers having short axes laid in the moving region of the mobile vulcanizing unit, so that the vulcanizing unit reciprocative driving apparatus can be simplified with a reduced cost.

Moreover, the vulcanizing unit reciprocative driving apparatus is reciprocated by moving the guide rail attached with the mobile vulcanizing unit on the rollers having shorter lengths, so that the vulcanizing unit supporting/guiding parts and the other mobile vulcanizing units can be disposed without any interference between the vulcanizing unit supporting/guiding parts and between the vulcanizing unit supporting/guiding part and the other mobile vulcanizing unit even at the mold opening/closing station and in the vicinity thereof where the vulcanizing unit reciprocative driving apparatuses provided in the respective vulcanizing stations are crossed each other.

(11)

The tire vulcanizing system according to the invention described in any one of (8) through (10), further comprises: a bladder attaching/detaching station disposed within a working area of the mold-opening/closing-station-aimed tire transferring apparatus and provided with a bladder attaching/detaching apparatus for attaching a bladder to a green tire and for detaching a bladder from a vulcanized tire.

This system is provided with the bladder attaching/detaching station having the bladder attaching/detaching apparatus for attaching/detaching a bladder to/from a tire, so that the number of required and prepared bladders can be remarkably reduced by attaching a bladder to a green tire just before loading into the vulcanizing mold while immediately detaching the bladder from the tire just after vulcanization and taken out of the vulcanizing mold, as compared with a situation where the detachment of bladders from vulcanized tires is conducted when a considerable time has lapsed after the tires have been taken out of vulcanizing molds, respectively. Further, the center mold opening/closing apparatus can be constituted in a manner simpler than a situation where the bladder attaching/detaching apparatus is disposed in the mold opening/closing station.

(12)

The tire vulcanizing system according to the invention described in any one of (8) through (10), further comprises: a bladder attaching/detaching apparatus disposed at the mold opening/closing station and for attaching a bladder to a green tire and for detaching a bladder from a vulcanized tire.

In this tire vulcanizing system, the bladder attaching/detaching apparatus is disposed in the mold opening/closing station, thereby enabling a more reduced number of required and prepared bladders as compared with the invention described in (11).

(13)

The tire vulcanizing system according to the invention described in any one of (8) through (12), further comprises: a post-vulcanization treatment station disposed within a working area of the mold-opening/closing-station-aimed tire transferring apparatus and for applying PCI to a vulcanized tire taken out of the vulcanizing mold.

According to this vulcanizing system, it is also possible to carry vulcanized tires into and out of the post-vulcanization treatment station by the one set of mold-opening/closing-station-aimed tire transferring apparatus, thereby enabling a further reduced equipment cost and installation space in addition to the above effects.

Note that when the above described bladder attaching/detaching station is provided in this vulcanizing system, vulcanized tires after application of PCI and still attached with bladders are to be carried into the bladder attaching/detaching station by the same mold-opening/closing-station-aimed tire transferring apparatus, and bladders are detached from the tires at the bladder attaching/detaching station.

(14)

The tire vulcanizing system according to the invention described in any one of (8) through (13), further comprises: an incoming and outgoing station comprising: a green tire placing stand for receiving a green tire from the exterior and for temporarily storing the tire; and a vulcanized tire placing stand for temporarily storing a vulcanized tire and transferring the tire to the exterior.

The incoming and outgoing station provided in the tire vulcanizing system is capable of functioning as a storing space for smoothly and exactly transferring the tires to those means inside and outside the vulcanizing system without deteriorating the timing.

(15)

In the tire vulcanizing system according to the invention described in (14), the incoming and outgoing station is disposed within the working area of the mold-opening/closing-station-aimed tire transferring apparatus, and the vulcanizing stations are arranged within one half sector of a circular plane area around the mold opening/closing station, and the mold-opening/closing-station-aimed tire transferring apparatus and the incoming and outgoing station are arranged within the other half sector of the circular plane area.

According to this tire vulcanizing system, since the incoming and outgoing station is disposed within the working area of the mold-opening/closing-station-aimed tire transferring apparatus, it is possible to directly load a green tire from the green tire placing stand into the vulcanizing mold in the mold opening/closing station, and to take a vulcanized tire out of the vulcanizing mold in the mold opening/closing station and to directly transfer the vulcanized tire onto the vulcanized tire placing stand of the incoming and outgoing station, thereby enabling the system to be simply constituted.

Further, since the vulcanizing stations, mold-opening/closing-station-aimed tire transferring apparatus and incoming and outgoing station are disposed in the circular plane area around the mold opening/closing station in this system, the carrying in/out operations of tires can be conducted only within this circular plane area while conducting other set-up operations such as exchange of vulcanizing molds outside the arc, so that the respective operation spaces are functionally separated from one another and the respective operations can be independently conducted without mutual interference, thereby also advantageously improving the production efficiency.

(16)

In the tire vulcanizing system according to the invention described in (14), the incoming and outgoing station is disposed closely to the bladder attaching/detaching station, and there are provided at least one set of manipulator between these stations and for transferring tires to the stations, and the vulcanizing stations are arranged within one half sector of a circular plane area around the mold opening/closing station, and the mold-opening/closing-station-aimed tire transferring apparatus, the bladder attaching/ detaching station and the incoming and outgoing station are arranged within the other half sector of the circular plane area.

According to this vulcanizing system, the manipulator is allowed to function to smoothly and rapidly conduct transference of tires between these mutually neighbored incoming and outgoing station and bladder attaching/detaching station.

Further, since the vulcanizing stations, mold-opening/closing-station-aimed tire transferring apparatus, bladder attaching/detaching station and incoming and outgoing station are disposed in the circular plane area around the mold opening/closing station in this system, the carrying in/out operations of tires can be conducted only within this circular plane area while conducting other set-up operations such as exchange of vulcanizing molds outside the arc, so that the respective operation spaces are functionally separated from one another and the respective operations can be independently conducted without mutual interference, thereby also advantageously improving the production efficiency.

(17)

In the tire vulcanizing system according to the invention described in (16), the manipulator comprises a green-tire aimed manipulator for carrying a green tire into the bladder attaching/detaching station and a vulcanized-tire aimed manipulator for carrying out a vulcanized tire to the incoming and outgoing station, between the incoming and outgoing station and the bladder attaching/detaching station.

According to this tire vulcanizing system, the manipulator functions of the green-tire aimed manipulator and vulcanized-tire aimed manipulator are separated from each other, thereby enabling predetermined transferring functions to be further improved, and thereby enabling a remarkably enhanced freedom degree of disposing positions of the incoming and outgoing station relative to the bladder attaching/detaching station.

(18)

The tire vulcanizing system according to the invention described in any one of (1) through (17), further comprises: a mold relaying station disposed outside the arc on which the vulcanizing stations are arranged, and disposed equidistantly to at least two of the vulcanizing stations, and a mold taking-in/out apparatus for taking a used vulcanizing mold out of each vulcanizing station to the mold relaying station and for accommodating a next-use vulcanizing mold into each vulcanizing station.

In the above described conventional vulcanizing process adopting the vulcanizing apparatus 311 shown in FIG. 21, it is frequent that the green tires GT are carried into vulcanizing molds 312 by multiple sets of carrying-in means 318 dedicated to vulcanizing molds 312 and disposed at one side of multiple apparatuses 311 arranged with an alignment on a straight line shown in a schematic plan view of FIG. 22 while the vulcanized tires T are taken out of vulcanizing molds 312 by multiple sets of carrying-out means 319 dedicated to molds 312 and disposed at the other side of the apparatuses 311 and are carried into post cure inflaters 320, respectively, so that the moving routes of tires spread over both sides of the apparatuses 311 such that vulcanizing operations of not only a specific apparatus 311 but also neighboring apparatuses 311 are required to be temporarily interrupted upon exchange of a vulcanizing mold 312 of the specific vulcanizing mold 312 in order to avoid interference of the vulcanizing operations with those preparing and performing operations for taking a used vulcanizing mold 312 out of the specific apparatus 311 and for accommodating a next-use vulcanizing mold 312 into the specific apparatus 311, thereby causing such a problem that the operating rates of the molds 312, carrying-in and out means 318, 319 are lowered to deteriorate the productivity while complicating the automatic exchange of molds 312, particularly in a production of small quantity and large variety.

On the contrary, in this vulcanizing system of the present invention, while the moving operations such as carrying in and out of tires only in the inside area of the arc connecting the vulcanizing stations, the operations for exchanging and preparing vulcanizing molds and the like are conducted in the outside area by the mold taking-in/out apparatus of the mold relaying station disposed outside the arc on which the vulcanizing stations are arranged, and disposed equidistantly to at least two of the vulcanizing stations, thereby enabling an advantageously improved productivity while exemplarily and readily realizing automatized mold exchange.

(19)

In the tire vulcanizing system according to the invention described in (18), the mold taking-in/out apparatus is of a turntable type, and in this system, the transference of vulcanizing molds in various directions can be smoothly conducted.

(20)

In the tire vulcanizing system according to the invention described in (18) or (19), the mold taking-in/out apparatus is provided with a bridging member for the vulcanizing stations, and a guiding member and reciprocal driving means for the vulcanizing molds; and this is preferable in transferring vulcanizing molds as heavy loads in a safe, easy and reliable manner.

(21)

The tire vulcanizing system according to the invention described in any one of (18) through (20), further comprises: a carriage disposed to receive a used vulcanizing mold from the mold taking-in/out apparatus and for transferring a next-use vulcanizing mold to the mold taking-in/out apparatus; and when there are provided placing spaces for two sets of vulcanizing molds on the carriage, the used vulcanizing mold on the mold taking-in/out apparatus can be received by one space on the carriage while a next-use vulcanizing mold previously placed on the carriage can be transferred to the thus emptied mold taking-in/out apparatus, so that the used vulcanizing mold on the carriage can be readily transported to a mold storage place or the like on the basis of running of the carriage.

(22)

The present invention further provides a tire vulcanizing apparatus comprising: at least one set of vulcanizing station provided with vertically arranged multiple stages of vulcanizing presses each including: a space for housing therein a vulcanizing mold; and upper and lower platens for clamping the vulcanizing mold from the above and below to thereby heat it; one set of mold opening/closing station neighbored to the vulcanizing stations; the mold opening/closing station being provided with: a base portion to be displaced upward and downward over a height range corresponding to the vulcanizing presses; mold transferring means for taking the vulcanizing molds into and out of the vulcanizing presses, respectively; and a center mold opening/closing apparatus for opening and closing each vulcanizing mold to allow a tire to be taken into and out of the vulcanizing mold; mold-opening/closing-station-aimed tire transferring apparatus disposed at one side of the mold opening/closing station, and for taking a tire into and out of the vulcanizing mold within the mold opening/closing station; and a mold taking-in/out apparatus disposed at the other side of the mold opening/closing station.

In this vulcanizing system, the vulcanizing presses are provided in vertically arranged multiple stages in each vulcanizing station, thereby enabling the occupying space of the system to be remarkably reduced as compared with a situation of vulcanizing units arranged in a plane, and the one set of mold opening/closing station is provided commonly to multiple stages of vulcanizing presses, thereby enabling the occupying space to be further reduced and the equipment cost to be advantageously reduced, while remarkably enhancing the operating rate of the equipment disposed in the mold opening/closing station under mutually independent operations of the vulcanizing molds.

Further, the mold transferring means for taking vulcanizing molds into and out of the vulcanizing presses and the mold opening/closing means are disposed on the base portion disposed at the mold opening/closing station and to be displaced upward and downward over a height range corresponding to the vulcanizing presses in this system, so that the planar spread of the equipment is restricted to thereby enable a further enhanced space efficiency.

Moreover, the tire transferring apparatus and the mold taking-in/out apparatus are provided at one and the other sides of the mold opening/closing station, respectively, so that the set-up, preparation and the like of mold exchange can be conducted at one side of the mold opening/closing station while handling the tires at the other side of the mold opening/closing station, thereby allowing an advantageously improved mold exchange efficiency and a readily automatized mold exchange.

(23)

In the tire vulcanizing system according to the invention described in (22), the mold opening/closing station is disposed between two sets of neighbored vulcanizing stations; thereby enabling further improved space efficiency, equipment operating rate and the like and a reduced equipment cost to be brought about, while realizing a further improved productivity.

(24)

In the tire vulcanizing system according to the invention described in (22) or (23), the mold taking-in/out apparatus is provided with: a bridging member for the mold opening/closing station; and a guiding member and reciprocal driving means for a vulcanizing mold; thereby enabling the vulcanizing molds as heavy loads to be smoothly and readily taken into and out of the mold opening/closing station.

(25)

In the tire vulcanizing system according to the invention described in (22) through (24), the mold taking-in/out apparatus is disposed on a carriage which runs closely to the mold opening/closing station.

This provides such advantages that the used vulcanizing mold received by the mold taking-in/out apparatus can be directly transported to a storage place of vulcanizing molds on the basis of running of the carriage, and the next-use vulcanizing mold can be directly carried out of the storage place.

(26)

In the tire vulcanizing system according to the invention described in (25), two sets of the mold taking-in/out apparatuses are juxtaposed on one carriage; so that, after a used vulcanizing mold is received by one mold taking-in/out apparatus, the next-use vulcanizing mold previously placed on the other mold taking-in/out apparatus can be immediately accommodated into the mold opening/closing station, thereby enabling the time from takeout to the completion of accommodation of a vulcanizing mold to be shortened.

(27)

The tire vulcanizing system according to the invention described in any one of (22) through (26), further comprises: a bladder attaching/detaching station disposed within a working area of the mold-opening/closing-station-aimed tire transferring apparatus and provided with a bladder attaching/detaching apparatus for attaching a bladder to a green tire and for detaching a bladder from a vulcanized tire.

This system is provided with the bladder attaching/detaching station having the bladder attaching/detaching apparatus for attaching/detaching a bladder to/from a tire, so that the number of required and prepared bladders can be remarkably reduced by attaching a bladder to a green tire just before loading into the vulcanizing mold while immediately detaching the bladder from the tire just after vulcanization and taken out of the vulcanizing mold, as compared with a situation where the detachment of bladders from vulcanized tires is conducted when a considerable time has lapsed after the tires have been taken out of vulcanizing molds, respectively. Further, the center mold opening/closing apparatus can be constituted in a manner simpler than a situation where the bladder attaching/detaching apparatus is disposed in the mold opening/closing station.

(28)

The tire vulcanizing system according to the invention described in any one of (22) through (26), further comprises: a bladder attaching/detaching apparatus disposed at the mold opening/closing station and for attaching a bladder to a green tire and for detaching a bladder from a vulcanized tire.

In this tire vulcanizing system, the bladder attaching/detaching apparatus is disposed in the mold opening/closing station, thereby enabling a more reduced number of required and prepared bladders as compared with the invention described in (27).

(29)

The tire vulcanizing system according to the invention described in any one of (22) through (28), further comprises: a post-vulcanization treatment station disposed within a working area of the mold-opening/closing-station-aimed tire transferring apparatus and for applying PCI to a vulcanized tire taken out of the vulcanizing mold.

According to this vulcanizing system, it is also possible to carry vulcanized tires into and out of the post-vulcanization treatment station by the one set of mold-opening/closing-station-aimed tire transferring apparatus, thereby enabling a further reduced equipment cost and installation space in addition to the above effects.

Note that when the above described bladder attaching/detaching station is provided in this vulcanizing system, vulcanized tires after application of PCI and still attached with bladders are to be carried into the bladder attaching/detaching station by the same mold-opening/closing-station-aimed tire transferring apparatus, and bladders are detached from the tires at the bladder attaching/detaching station.

(30)

The tire vulcanizing system according to the invention described in any one of (22) through (29), further comprises: an incoming and outgoing station comprising: a green tire placing stand for receiving a green tire from the exterior and for temporarily storing the tire; and a vulcanized tire placing stand for temporarily storing a vulcanized tire and transferring the tire to the exterior.

The incoming and outgoing station provided in the tire vulcanizing system is capable of functioning as a storing space for smoothly and exactly transferring the tires to those means inside and outside the vulcanizing system without deteriorating the timing.

(31)

In the tire vulcanizing system according to the invention described in (30), the incoming and outgoing station is disposed within the working area of the mold-opening/closing-station-aimed tire transferring apparatus.

According to this tire vulcanizing system, since the incoming and outgoing station is disposed within the working area of the mold-opening/closing-station-aimed tire transferring apparatus, it is possible to directly load a green tire from the green tire placing stand into the vulcanizing mold in the mold opening/closing station, and to take a vulcanized tire out of the vulcanizing mold in the mold opening/closing station and to directly transfer the vulcanized tire onto the vulcanized tire placing stand of the incoming and outgoing station, thereby enabling the system to be simply constituted.

(32)

In the tire vulcanizing system according to the invention described in (30), the incoming and outgoing station is disposed closely to the bladder attaching/detaching station, and there are provided at least one set of manipulator between these stations and for transferring tires to the stations.

According to this vulcanizing system, the manipulator is allowed to function to smoothly and rapidly conduct transference of tires between these mutually neighbored incoming and outgoing station and bladder attaching/detaching station.

(33)

In the tire vulcanizing system according to the invention described in (32), the manipulator comprises a green-tire aimed manipulator for carrying a green tire into the bladder attaching/detaching station and a vulcanized-tire aimed manipulator for carrying out a vulcanized tire to the incoming and outgoing station, between the incoming and outgoing station and the bladder attaching/detaching station.

According to this tire vulcanizing system, the manipulator functions of the green-tire aimed manipulator and vulcanized-tire aimed manipulator are separated from each other, thereby enabling predetermined transferring functions to be further improved, and thereby enabling a remarkably enhanced freedom degree of disposing positions of the incoming and outgoing station relative to the bladder attaching/detaching station.

(34)

The present invention also provides a tire manufacturing method to be used in the tire vulcanizing system described in any one of (1) through (33), comprising the steps of: causing at least one kind of tire size to have vulcanizing processes including a vulcanizing process having a vulcanizing time common to that of a vulcanizing process of any one of other tire sizes; and constituting a size allotment of a plurality of tire sizes having common vulcanizing times, upon allotment of sizes of tires to be vulcanized in vulcanizing stations after a changeover of any one of tire sizes.

The term "to allot sizes" used herein means to determine tire sizes to be vulcanized in the respective vulcanizing stations upon establishing a production schedule, and the term "vulcanizing time" used herein means a period of time from closure of a vulcanizing mold housing therein a green tire to opening of the vulcanizing mold.

Further, the term "vulcanizing process" used herein is to determine vulcanizing conditions such as vulcanizing time, vulcanizing temperature, intra-bladder pressure, applicable mold and the like upon producing a tire of certain size. Moreover, "to prepare a vulcanizing process" used herein means to prepare a state capable of starting vulcanization on the basis of the vulcanizing process upon receiving a vulcanizing command.

Meanwhile, upon determining a vulcanizing process, it is one of important conditions concerning tire quality, to give an appropriate vulcanization degree to a tire. Insufficient vulcanization degrees fail to give sufficient strength and durability to the tire, while excessive vulcanization rather deteriorates the rubber itself and thus durability thereof. The vulcanization degree depends on the vulcanizing temperature and vulcanizing time, and higher vulcanizing temperatures and longer vulcanizing times lead to higher vulcanization degrees. Speaking conversely, there exist innumerable combinations of vulcanizing temperatures and vulcanizing times which satisfy an appropriate vulcanization degree.

There has been conventionally determined a vulcanizing process having a vulcanizing time which is the shortest one corresponding to the allowed highest vulcanizing temperature among such innumerable combinations of vulcanizing temperatures and vulcanizing times. This is because, one set of vulcanizer produces tires of only one size and multiple vulcanizers independently operate in the conventional vulcanizing system, so that the productivity naturally becomes high when the vulcanizing times of vulcanizing processes of various sizes are set to be shorter.

However, in such a vulcanizing system where independently operating multiple molds are exemplarily opened and closed by one set of common mold opening/closing apparatus and tires are taken in/out by one set of common vulcanizing-station-aimed tire transferring apparatus, although the operating rates of the mold opening/closing apparatus and the vulcanizing-station-aimed tire transferring apparatus can be enhanced, there exists such a restriction that all tire sizes are required to have vulcanizing processes having the same vulcanizing times upon size allotment of tires to be vulcanized in the respective molds. Namely, this means that all the molds are allowed to be allotted only with the same sizes or only with those sizes at least having the vulcanizing processes of the same vulcanizing time.

This is because, if the vulcanizing times of respective tires are different and the mold opening/closing apparatus is operated at a higher operating rate, there should occur at some time such a state where multiple tires are completely vulcanized substantially at the same time, and then, some tires are to be left in states where the molds are closed since the mold opening/closing apparatus or vulcanizing-station-aimed tire transferring apparatus is only one, such that these tires closed in the hot molds are obliged to be further vulcanized into over-vulcanized states, thereby resulting in defective tires. To avoid the above, it is required to allot sizes such that all sizes have the same vulcanizing times, and the mold opening/closing apparatus sequentially opens and closes the respective molds so as to operate at a constant cycle.

This will be explained in more detail with reference to FIG. 23. FIG. 23($a$) and FIG. 23($b$) are machine charts representing operated states of respective molds, each having abscissa and ordinate representing time and molds, respectively. In FIG. 23($a$), all of eight sets of molds have vulcanizing times of eight minutes. Upon termination of vulcanization of a mold, the mold opening/closing apparatus is to move to the mold, open it, and take a vulcanized tire out of it, and then deliver a green tire into the mold and close it. Then, this mold resumes vulcanization. This cycle is repeated. Further, the mold opening/closing apparatus is capable of completing the operation for one mold, in one minute at the longest including the movement time. Thus, this vulcanizing system is to operate on the basis of a vulcanizing cycle of totally nine minutes. It is enough for the mold opening/closing apparatus to work only for eight minutes in the vulcanizing cycle of nine minutes, thereby establishing a leeway of one minute.

FIG. 23(b) is a machine chart where the vulcanizing time of tire to be vulcanized in the mold 6 is nine minutes which are longer than those for other sizes by one minute. As shown, the mold 6 and mold 7 simultaneously finish vulcanization, such that the mold opening/closing apparatus leaves the mold 6 in a closed state for two minutes, thereby causing a possibility of an over-vulcanized defective tire.

In the above, it has been described that the allotment of sizes having the same vulcanizing times is an indispensable condition for operating the system, and this means a further problem to be exemplified below. For example, in case of trying to produce tires of a size having an extremely small production amount and having a vulcanizing time different from those of other sizes in this vulcanizing system, it is required to simultaneously produce such tires by using many molds of this size irrespectively of the extremely small production lot if the vulcanizing system is to be fully operated because it is impossible to simultaneously and mixedly produce this tire and other tires having different sizes, so that the mold cost necessarily becomes enormous. Conversely, upon trying to produce the tires by only one piece of mold so as to save the mold cost, the operating rate of the mold opening/closing apparatus and the like is reduced and the installation space of molds is disused, thereby failing to match with the inherent purpose to improve the operating rate of the mold opening/closing apparatus and thereby rather deteriorating the efficiency from a standpoint of installation cost.

Anyway, such production is ineffective and such a system is allowed to be applied only to tire sizes having larger production lots, thereby leading to a system which opposes to the recent tendency of smaller lots, and resulting in a basic problem of difficulty in practicing the system.

The present invention has been achieved in view of such a problem, and it is an object of the present invention to provide a practical tire manufacturing method and a practical vulcanizing system capable of effectively reducing an equipment cost and being applicable to smaller lot production.

According to the tire manufacturing method of the present invention, those tires of different sizes are caused to have the common vulcanizing times, so that all of the vulcanizing stations and the mold opening/closing apparatus can be fully operated even when these different sizes are mixedly allotted, because the vulcanizing times thereof are the same. Further, since the vulcanizing times of tires for all of the vulcanizing stations are the same, over-vulcanized defective tires are never produced.

To cause tires of different sizes to have the common vulcanizing times means to unify the vulcanizing times to that of a tire having the longest vulcanizing time, which has not been inherently considered because the productivity of the conventional vulcanizing system is reduced then.

Practically, it is desirable to divide all tire sizes intended by this vulcanizing system into groups, and to unify the vulcanizing times to the vulcanizing time of that tire size in the group which has a tire process of the longest vulcanizing time, such that the size allotment is conducted by selecting those sizes in the same group. Although it is conceivable as an alternative scheme to unify the vulcanizing times of all tire sizes intended by this vulcanizing system, this scheme means that such a tire capable of being inherently vulcanized in a short vulcanizing time is obliged to be set at the same vulcanizing time as the size having the longest "shortest vulcanizing time", thereby undesirably and considerably lowering the productivity.

(35)

The tire vulcanizing system according to the invention described in (34), further comprises the steps of: for the tire size having vulcanizing processes including the vulcanizing process having the vulcanizing time common to that of a vulcanizing process of any one of other tire sizes, preparing another vulcanizing process having a vulcanizing time different from the common vulcanizing time; and for the size allotment to be constituted of a plurality of tire sizes having common vulcanizing times, selecting those vulcanizing processes having the shortest vulcanizing times, respectively, among vulcanizing processes having the common vulcanizing times.

This tire manufacturing method has been thought out as a result of such an earnest consideration for causing different tire sizes to have common vulcanizing times while improving productivity, in a manner to prepare a plurality of vulcanizing processes having different vulcanizing times for one size, to permanently select the vulcanizing processes having shorter vulcanizing times, i.e., having higher productivities correspondingly to sequential size allotments, respectively, and to conduct the vulcanization, thereby realizing the higher productivity.

This will be explained for better understanding, by taking a vulcanizing system for producing tires of three sizes A, B and C at three vulcanizing stations, respectively, for example. There are prepared a plurality of vulcanizing processes for each size. Prepared for the size A are three processes a1, a2, a3 having vulcanizing times TS, TM, TL in the order from short to long. Prepared for the size B are two vulcanizing processes b1, b2 having vulcanizing times TM, TL, and so is one vulcanizing process c1 having a vulcanizing time TL for the size C. Contrary to the conventional vulcanizing method where only vulcanizing processes a1, b1, c1 are prepared for three sizes, respectively, such multiple vulcanizing processes are prepared in the present invention.

In a size allotment where all three vulcanizing stations are allotted with the size A, the maximum productivity is obtained by conducting the vulcanization by the shortest vulcanizing time TS.

Next, in trying to conduct the mixed production of sizes A and B by changing over the size A of one vulcanizing station to the size B, it was impossible to conduct this combination of production in the conventional vulcanizing method using a single vulcanizing process, because the sizes A and B have different vulcanizing times TS and TM, respectively, so that completion of vulcanization should occur at some time to thereby cause an over-vulcanized tire. However, it is appropriate to execute the vulcanizing processes a2 and b1 both having vulcanizing times TM, in the scheme of the present invention. Although it is possible to execute the vulcanizing processes a3 and b2 both having the vulcanizing time TL, it is more advantageous to select the former combination a2 and b1 leading to higher productivities and to conduct the production.

Furthermore, while the three sizes A, B, C are to be simultaneously produced when the size A is changed over to the size C in another vulcanizing station, the operating rate is not lowered even in this situation because the vulcanization is conducted by the vulcanizing processes a3, b2, c1 all having the vulcanizing time TL.

Although it is conceivable to prepare only those processes a3, b2, c1 having the vulcanizing time TL as an alternative scheme to unify the vulcanizing times to be comparable to the present invention, it is then required to produce tires of the size A by the vulcanizing time TL even in case of the size allotment of only size A and the size allotment of sizes A and B, thereby apparently, disadvantageously and considerably reducing the productivity.

(36)

The tire vulcanizing system according to the invention described in any one of (1) through (33), further comprises: a controlling apparatus comprising: a system controlling part for controlling the whole of the vulcanizing system, vulcanizing-station controlling parts corresponding to the vulcanizing stations, respectively, so as to at least conduct the control for executing a tire vulcanizing process, and a transmitting part for transmitting information from the system controlling part to the vulcanizing stations; wherein upon any one of size changeovers, the transmitting part transmits information including vulcanizing processes or including commands of vulcanizing process changes, to that vulcanizing station for conducting the size changeover and additionally to other vulcanizing stations for vulcanizing tires of sizes having a plurality of vulcanizing processes, respectively.

Although vulcanizing stations have been conventionally controlled on the basis of single vulcanizing processes correspondingly to respective sizes, the plurality of vulcanizing processes are prepared for each size in the tire manufacturing method described in (35), and which vulcanizing process each vulcanizing station is to be controlled based on, is varied according to the sequential size allotment.

In the vulcanizing system of the present invention, the selected vulcanizing processes or the selecting commands as to which vulcanizing processes are to be selected are transmitted correspondingly to size allotments from the system controlling part even to those vulcanizing-station controlling parts corresponding to vulcanizing stations which do not conduct size changeovers, such that the vulcanizing-station controlling parts are allowed to start to control the vulcanizing processes on the basis of the transmitted ones, thereby enabling tires to be vulcanized by the tire manufacturing method described in (35), to thereby enable vulcanization of a higher operating rate and a higher productivity.

BRIEF DESCRIPTION OF THE DRAWINGS

FIG. 17 is a drawing showing an operation of a vulcanizing press;

FIG. 23 is an explanatory view showing a vulcanizing cycle.

BEST MODE FOR CARRYING OUT THE INVENTION

There will be explained hereinafter a vulcanizing system according to a first embodiment of the present invention, with reference to FIG. 1 through FIG. 7.

Figure 1:
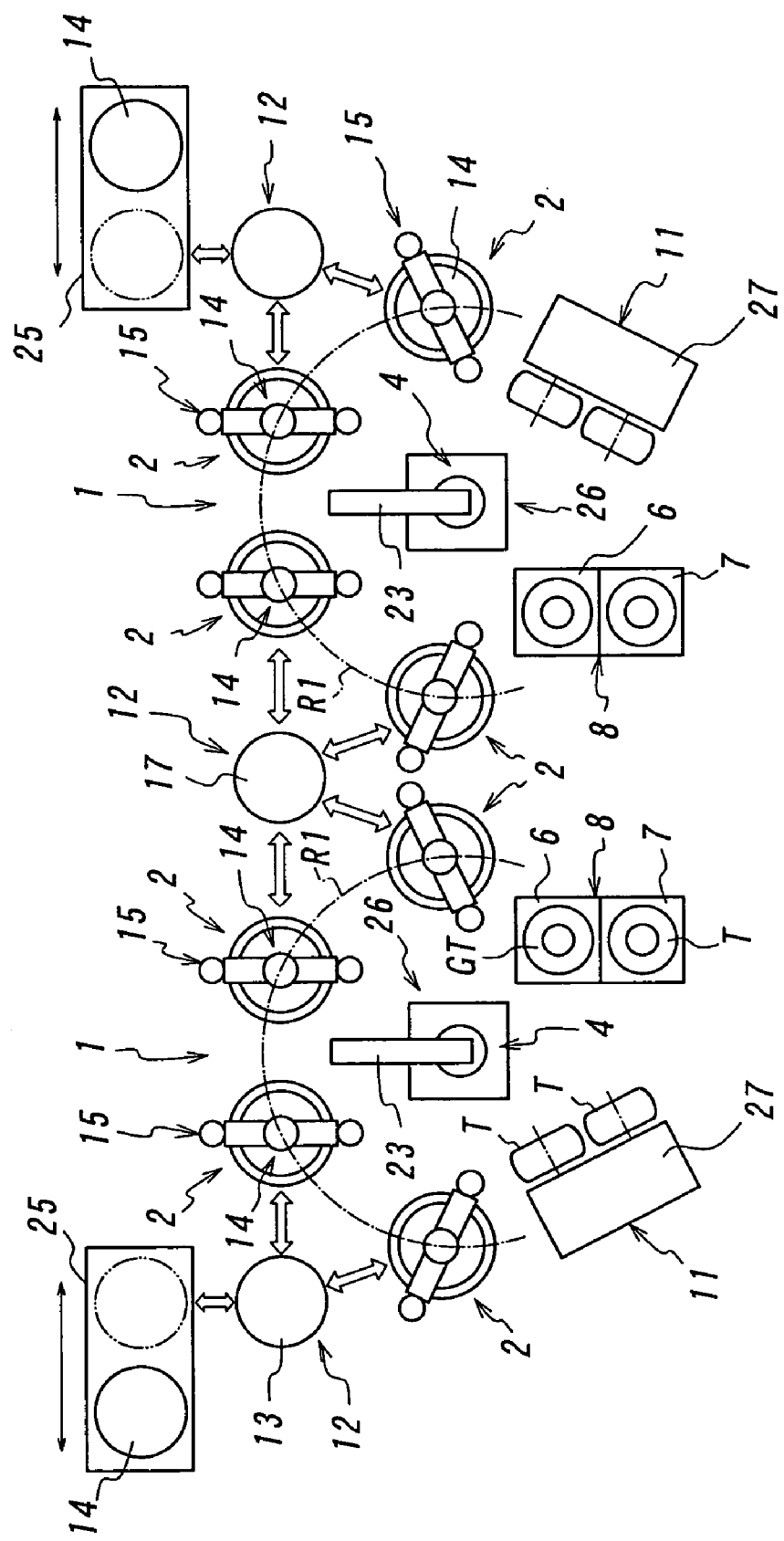
FIG. 1 is a schematic plan view of a vulcanizing system according to a first embodiment of the present invention.

FIG. 1 is a schematic plan view of the first embodiment of the vulcanizing system in a situation where two identical tire vulcanizing systems are disposed in a neighbored manner. Each tire vulcanizing system 1 herein is provided with: four vulcanizing stations 2 arranged in a plane on an arc and circumferentially positioned substantially equidistantly; and a tire handling station 26 inside this arc R1; in a manner that each handling station 26 is provided with one set of vulcanizing-station-aimed tire transferring apparatus 4 of a swiveling arm type common to all of the associated vulcanizing stations 2 and this tire transferring apparatus 4 is positioned substantially equidistantly to all of the associated vulcanizing stations 2, while providing mold relaying stations 12 outside the arc R1 in a manner that each mold relaying station 12 is positioned substantially equidistantly from at least two vulcanizing stations 2 such that each mold relaying station 12 is provided with a mold taking-in/out apparatus 13, preferably of a turntable structure, for taking used vulcanizing molds out of the associated adjacent vulcanizing stations 2 and for taking next-use vulcanizing molds into the vulcanizing stations 2.

Preferably, provided within a working area of each tire transferring apparatus 4 herein is an incoming and outgoing station 8 including a green tire placing stand 6 for temporarily placing thereon a green tire GT and a vulcanized tire placing stand 7 for temporarily placing thereon a vulcanized tire T, in mutually neighbored postures, for example.

Note that it is possible in this figure that the stands 6, 7 mutually neighbored in the fore-and-aft direction in the same plane are modified to be neighbored in the up-and-down direction or the right-and-left direction, and in either case, it is desirable to take a green tire GT onto the associated stand 6 and to take a vulcanized tire T out of the stand 7 by utilizing a belt conveyor or other taking out means (not shown).

Further preferably, post-vulcanization treatment stations 11 are provided within the working areas of the tire transferring apparatuses 4 alternatively or additionally to the above, respectively, and each station 11 is provided with a post cure inflater 27 for applying PCI to a vulcanized tire T the bladder of which is still included therein or detached therefrom.

Figure 2:
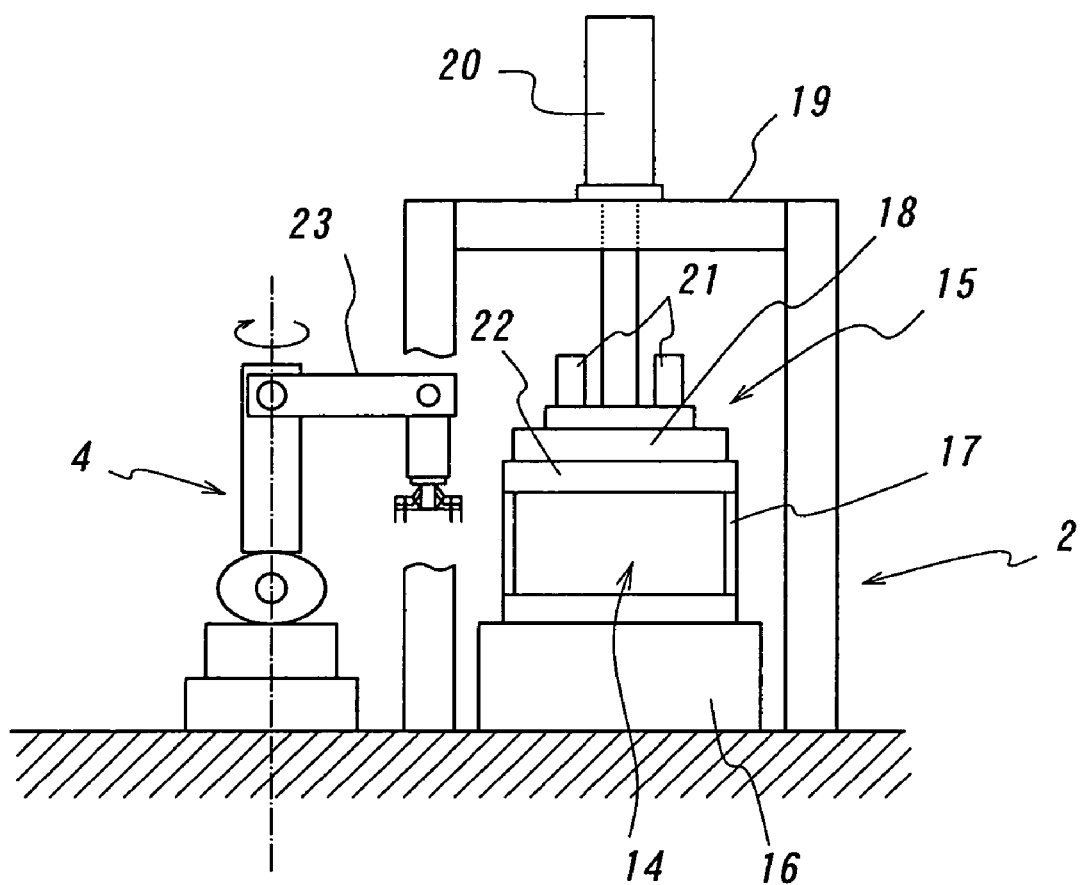
FIG. 2 is a schematic side view of a mold opening/closing apparatus and a tire transferring apparatus.

As shown in the schematic side view of FIG. 2, each vulcanizing station 2 is provided with a vulcanizing mold 14 and a local mold opening/closing apparatus 15 for opening and closing the vulcanizing mold 14, such that the vulcanizing mold 14 with a container 17 is placed on a lower platen 16 heated by a heating medium contributing to heating the vulcanizing mold 14, while an upper platen 18 similarly contributing to heating the vulcanizing mold 14 is enabled to be displaced upward and downward by a cylinder 20 attached to a portal frame 19, and the upper platen 18 is releasably coupled to an upper surface plate 22 of the container 17 via coupling means 21, thereby bringing about an interconnection of the vulcanizing mold 14 with the mold opening/closing apparatus 15.

In this way, upon loading a green tire GT into the vulcanizing mold 14 and unloading a vulcanized tire T therefrom, the cylinder 20 in a state coupled to the upper surface plate 22 of the upper platen 18 is operated to thereby displace the upper mold-piece of the vulcanizing mold 14 upward, thereby enabling the vulcanizing mold 14 to be opened.

Meanwhile, vulcanization to a green tire GT loaded into the vulcanizing mold 14 can be conducted by displacing the upper mold-piece downward together with the upper platen 18 by the cylinder 19 so as to pressurizedly close the vulcanizing mold 14 while simultaneously heating the vulcanizing mold 14 to a predetermined temperature.

Note that supply of a pressurizing and heating gas into a shaping bladder attached to the green tire GT in the vulcanizing process can be conducted by exemplarily connecting a gas supplying source to the bladder by a joint cylinder or other means (not shown) at the lower platen 16 side, and it is desirable in this case to maintain the supplied internal pressure within the bladder even after releasing the connection of the bladder to the gas supplying source or the like.

Meantime, separation of the vulcanizing mold 14 from the upper platen 18 such as upon exchanging the former can be conducted by releasing the coupling of the upper surface plate 22 to the upper platen 18 under an action of the coupling means 21, and it is possible here to smoothen and facilitate exchange of the vulcanizing mold 14 under release of fixation of the vulcanizing mold 14 to the lower platen 15, by displacing the upper platen 18 upward extremely above the vulcanizing mold 14.

The one set of vulcanizing-station-aimed tire transferring apparatus 4 to be arranged equidistantly from the associated vulcanizing stations 2 and provided with a swiveling arm 23 is preferably constituted of an articulation or multi-articulation type robot, and this tire transferring apparatus 4 functions: to grip a green tire GT on the green tire placing stand 6 of the incoming and outgoing station 8 by a hand of the apparatus 4 and to load it into the vulcanizing mold 14 in an opened posture; and to unload the tire T vulcanized by the vulcanizing mold 14 therefrom, and to directly transport the tire onto the vulcanized tire placing stand 7 of the incoming and outgoing station 10, or to indirectly transport the tire to the vulcanized tire placing stand 7 after applying PCI to the tire at the post cure inflater 27 of the post-vulcanization treatment station 11 thereby preventing heat shrinkage of a carcass ply cord and improving performance of a product tire.

This tire transferring apparatus 4 preferably made of the multi-articulation type robot as illustrated in FIG. 2 is capable of taking a compact posture during disuse thereof between the vulcanizing stations 2 and stations 8, 11 arranged sufficiently close to the tire transferring apparatus 4 without interfering with equipments within these stations, and capable of causing a hand or the like of the tire transferring apparatus 4 upon usage thereof to reach the required positions of the stations 2, 8, 11 while avoiding interference with other equipment under operation of the articulations upon transporting and transferring the tires.

Figure 3:
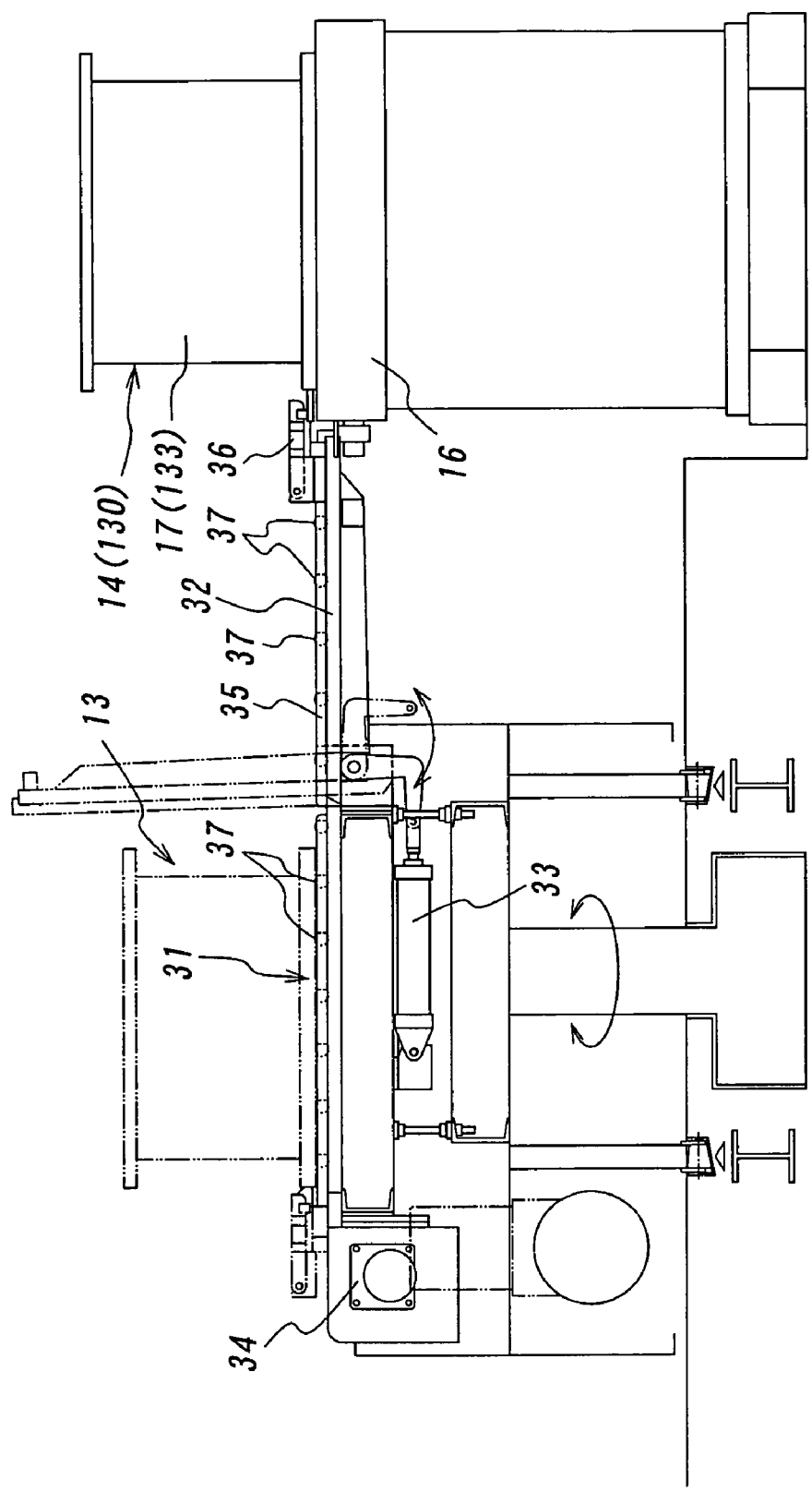
FIG. 3 is a longitudinal cross-sectional view showing a mold taking-in/out apparatus.

Further, the mold taking-in/out apparatus 13 disposed on each mold relaying station 12 common to multiple vulcanizing stations 2 and provided outside the arc R1 exhibits a turntable structure as a whole as illustrated in the schematic side view of FIG. 3, and can be constituted of: a taking-in/out apparatus body 31 rotatable about its central axis within a horizontal plane; a bridging member 32 hinged to the body 31; a cylinder 33 provided on the taking-in/out apparatus body 31, so as to operate the bridging member 32 between an operative posture where the cross-linking member 32 is bridged to the vulcanizing station 2, for example, to the lower platen 16 fixedly arranged there, and an inoperative posture lifted from the operative posture by about 90°; a motor 34 attached to the taking-in/out apparatus body 31; a chain 35 to be driven by the motor 34 and running from the taking-in/out apparatus body 31 up to the bridging member 32; an engaging member 36 for the vulcanizing mold 14 and attached to the chain 35; and a plurality of guide rollers 37 disposed on the taking-in/out apparatus body 31 and up to the bridging member 32, so as to guide a smooth movement of the vulcanizing mold 14 in the running direction of the chain 35.

Upon utilizing the mold taking-in/out apparatus 13 so as to exchange the used vulcanizing mold 14 in a specific vulcanizing station 2 with a next-use vulcanizing mold 14, the bridging member 32 is firstly laid flat into its operative posture and the tip end of the bridging member 32 is engaged with the lower platen 16 in a state where the taking-in/out apparatus body 31 of the turntable structure is brought into a rotated posture for extending the chain 35 toward the specific vulcanizing station 2, thereafter the engaging member 36 attached to the chain 35 is exemplarily engaged with the container 17 of the vulcanizing mold 14 and the chain 35 is driven to perfectly pull out the vulcanizing mold 14 onto the taking-in/out apparatus body 31 via bridging member 32 under operation of the guide rollers 37 and to position the vulcanizing mold 14 there, and then the bridging member 32 is lifted to the inoperative posture shown by a virtual line in the drawing so that the bridging member 32 is released from the lower platen 16 and in this state the taking-in/out apparatus body 31 is brought into a rotated posture where the chain 35 of the taking-in/out apparatus body 31 is extended to a carriage 25 to thereby engage the bridging member 32 with the carriage 25 upon which the used vulcanizing mold 14 on the taking-in/out apparatus body 31 is transferred to the carriage 25 under operation of the chain 35, engaging member 36 and the like.

After relaying the takeout of the vulcanizing mold 14 by the mold taking-in/out apparatus 13 in this way, the carriage 25 is moved in the inoperative posture of the bridging member 32 and the next-use vulcanizing mold 14 previously placed on the carriage 25 is transferred onto the taking-in/out apparatus body 31 of the mold taking-in/out apparatus 13 by operations of the bridging member 32, chain 35, engaging member 36 and the like, then the taking-in/out apparatus body 31 is rotated within a horizontal plane to thereby oppose the taking-in/out apparatus body 31 to the vulcanizing station 2 from which the used vulcanizing mold 14 has been taken out, and thereafter the vulcanizing mold on the taking-in/out apparatus body 31 is pressedly arranged into the vulcanizing station 2 also under operations of the vulcanizing station 2, chain 35, engaging member 36 and the like.

The above described exchange of the vulcanizing mold 14 is to be conducted outside the arc R1 without disturbing and independently of the vulcanizing operation accompanied by operation for taking tires into other vulcanizing stations 2, and thereafter the mold taking-in/out apparatus 13 is to wait a next exchange of a vulcanizing mold 14.

Further, the illustrated post cure inflater 27 disposed in each post-vulcanization treatment station 11 existent within the working area of the vulcanizing-station-aimed tire transferring apparatus 4 is to exemplarily cool a plurality of vulcanized tires T the bladders of which are still included therein or detached therefrom as taken out of the vulcanizing molds 14 by the tire transferring apparatus 4, and the vulcanized tire T applied with the required PCI there is taken out to the incoming and outgoing station 8 also by the tire transferring apparatus 4.

In the tire vulcanizing system as described above, each green tire GT transported onto the green tire placing stand 6 of the associated incoming and outgoing station 8 by transporting means (not shown) within an inside area of the arc R1 is loaded into the vulcanizing mold 14 of a pertinent vulcanizing station 2 by the associated tire transferring apparatus 4.

Meantime, each vulcanized tire T having been vulcanized by the associated vulcanizing mold 14 is taken out of the vulcanizing mold 14 in its opened posture by the tire transferring apparatus 4 and transferred to the post cure inflater 27 of the post-vulcanization treatment station 11, and upon completion of PCI there, the vulcanized tire T is placed onto the vulcanized tire placing stand 7 of the incoming and outgoing station 10 again under operation of the tire transferring apparatus 4, and thereafter exemplarily transported to a next process by transporting means (not shown).

In case of exchanging the used vulcanizing mold 14 in a specific vulcanizing station 2 with a new one after repeating the above operations, there is exemplarily released the restraint on the upper surface plate 21 and thus on the whole of the used vulcanizing mold 14 by the coupling means 21 of the mold opening/closing apparatus 15 of the vulcanizing station 2, then the upper platen 18 is highly raised and displaced by the cylinder 20 to thereby reserve a larger space above the container 17 of the vulcanizing mold 13, and in this state, the vulcanizing mold 13 is transferred to the most adjacent mold taking-in/out apparatus 13 of the mold relaying station 12 outside the arc R1, particularly to the taking-in/out apparatus body 31 under operations of the bridging member 32, chain 35, engaging member 36, guide rollers 37 and the like as described above, and then further transferred to the carriage 25 therefrom.

Meantime, the next-use vulcanizing mold 14 previously prepared on the same carriage 25 is similarly transferred to the specific vulcanizing station 2 through the same mold relaying station 12, and this vulcanizing mold 14 is attached to the mold opening/closing apparatus 15.

Thus, according to this tire vulcanizing system, the plurality of vulcanizing stations 2 are disposed on the arc R1 and the one set of vulcanizing-station-aimed tire transferring apparatus 4 common to all of the associated vulcanizing stations 2 is disposed at the central location of the arc R1, thereby enabling the occupying space and equipment cost of the vulcanizing system to be advantageously reduced, and enabling the tire transferring apparatus 4 to be arranged sufficiently closely to and equidistantly to the vulcanizing stations 2 to thereby remarkably improve the productivity without requiring a higher precision for the respective operating mechanism portions.

Further, exchange of vulcanizing molds 14 is separately and independently conducted without interfering with vulcanizing operations within the inside area of the arc R1, by the mold taking-in/out apparatus 13 of each mold relaying station 12 provided outside the arc R1 and common to multiple vulcanizing stations 2, thereby enabling a remarkably enhanced operating rate of the vulcanizing molds 14 and the like and an advantageously improved productivity while readily automatizing the mold exchange.

Although the vulcanizing system according to the present invention has been explained for a situation where a formed green tire GT is vulcanization molded by using a shaping bladder, this vulcanizing system is applicable to: a situation where a green tire is directly shaped without using a shaping bladder; and a situation where a green tire GT is formed on a rigid core which can be disassembled and having an outer surface shape corresponding to an inner surface shape of a product tire, this green tire GT together with the rigid core is loaded into the vulcanizing mold 14 and vulcanization molded thereby, and then the rigid core is unloaded from the vulcanized tire T after vulcanization by disassembling the rigid core.

Further, although attachment and detachment of a bladder or rigid core to and from a tire is assumed to be conducted on the vulcanizing station 2 or outside the tire vulcanizing system 1 shown in FIG. 1, it is alternatively possible to provide one set of station for attaching/detaching a bladder to/from a tire within the vulcanizing system such that attachment and detachment of bladders are intensively conducted in the vulcanizing system, and it becomes possible in this case to reduce the equipment cost by the intensive bladder attachment and detachment, and to shorten the time during which the bladder is attached to the tire as compared with a situation for conducting the attachment and detachment of the bladder outside the system, thereby enabling the largely reduced number of required bladders.

Figure 4:
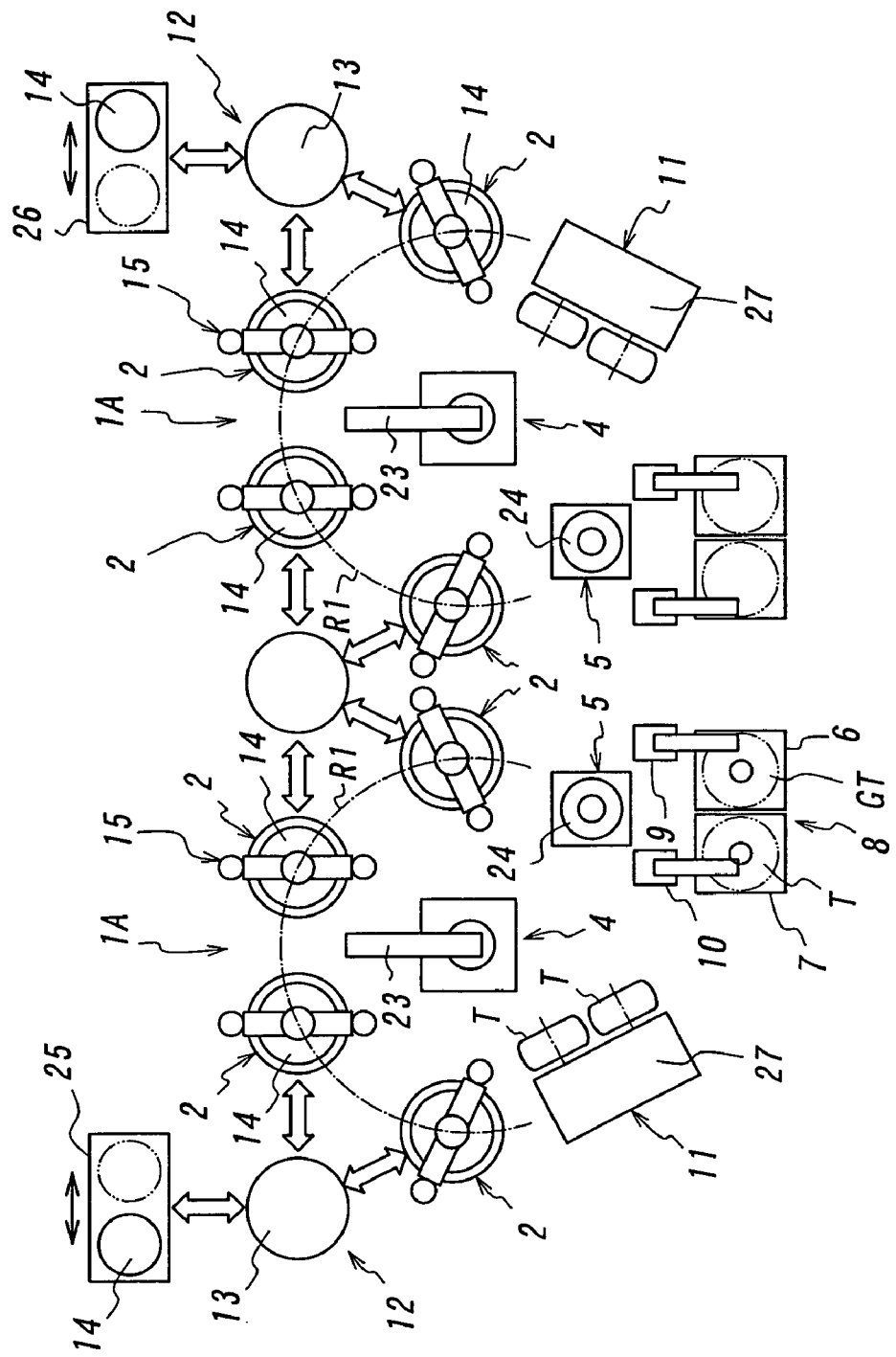
FIG. 4 is a schematic plan view showing a modified embodiment of the vulcanizing system of the first embodiment.

FIG. 4 is a schematic plan view showing a tire vulcanizing system 1A as a modified embodiment of the first embodiment, provided with such a bladder attaching/detaching station 5, in a situation where two sets of the same tire vulcanizing systems 1A are disposed in a mutually neighbored manner. In each tire vulcanizing system 1A, like reference numerals as used in the tire vulcanizing system 1 of the first embodiment are used to denote identical elements.

Each tire vulcanizing system 1A herein is provided with: four sets of vulcanizing stations 2 arranged in a plane on an arc and circumferentially positioned substantially equidistantly; one set of vulcanizing-station-aimed tire transferring apparatus 4 common to the vulcanizing stations 2, at a central location of the arc R1, such that the tire transferring apparatus 4 is positioned substantially equidistantly to all of the vulcanizing stations 2; and a bladder attaching/detaching station 5 within the working area of the tire transferring apparatus 4, for attaching a green tire to a bladder and for detaching a bladder from a vulcanized tire.

Preferably, provided adjacently to the bladder attaching/detaching station 5 herein are: an incoming and outgoing station 8 including a green tire placing stand 6 for temporarily placing thereon a green tire GT before attachment of a bladder and a vulcanized tire placing stand 7 for temporarily placing thereon a bladder-detached vulcanized tire T, in mutually neighbored postures, for example; and at least one set, and two sets in the drawing, of manipulators 9, 10 between these stations 5, 8, for transferring tires GT, T to the stations 5, 8, respectively. One manipulator 9 functions to take a green tire GT on the green tire placing stand 6 into the bladder attaching/detaching station 5, and the other manipulator 10 functions to take the vulcanized tire T, the bladder for which is detached therefrom by the bladder attaching/detaching station 5, out of the bladder attaching/detaching station 5 onto the vulcanized tire placing stand 7.

Further preferably, post-vulcanization treatment stations 11 are provided within the working areas of the tire transferring apparatuses 4 alternatively or additionally to the above, respectively, such that each station 11 is provided with a post cure inflater 27 for applying PCI to a bladder-containing vulcanized tire T.

Provided outside the arc R1 are mold transiting stations 12 each of which is arranged equidistantly to at least two vulcanizing stations 2, and each mold relaying station 12 is provided with a mold taking-in/out apparatus 13 preferably of a turntable structure for taking a used vulcanizing mold out of each of the adjacent vulcanizing stations 2 and for accommodating a next-use vulcanizing mold into the vulcanizing station 2.

The vulcanizing stations 2 have been previously explained on the basis of FIG. 2, and the mold transiting stations 12 and mold taking-in/out apparatuses 13 have been previously explained with reference to FIG. 3, so that the detailed description thereof shall be omitted here. Further, also the tire transferring apparatuses 4, post-vulcanization treatment stations 11 and incoming and outgoing stations 8 have been previously described, so that the detailed description thereof shall be omitted.

Figure 5:
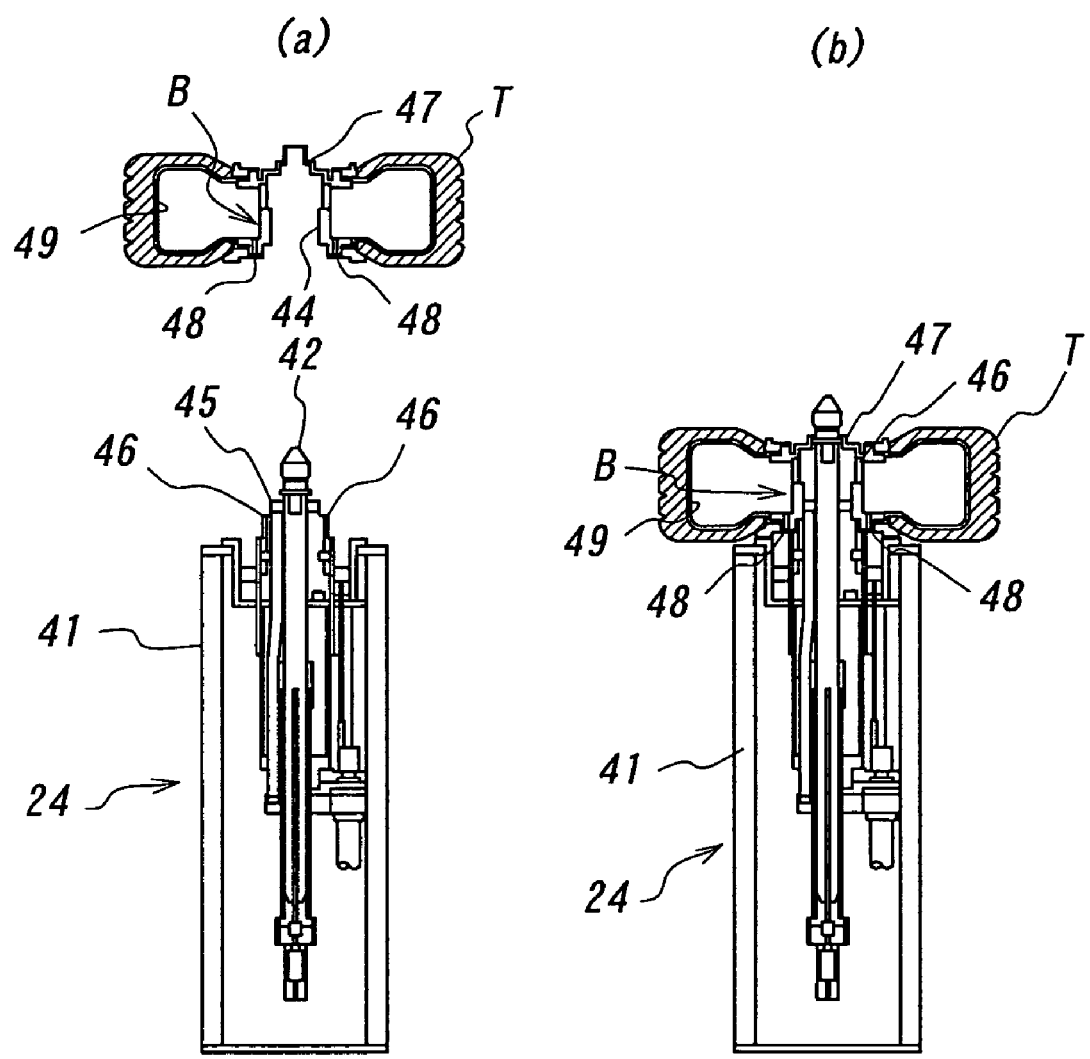
FIG. 5 is a longitudinal cross-sectional view showing a bladder attaching/detaching apparatus and an operation thereof.

Further, each bladder attaching/detaching station 5 provided within the working area of the associated tire transferring apparatus 4 is provided with a bladder attaching/detaching apparatus 24. As shown in the schematic cross-sectional view of FIG. 5, this bladder attaching/detaching apparatus 24 is provided with a center post 42 to be displaced upward and downward relative to the attaching/detaching apparatus body 41, a lower ring holder 45 to be fitted into a lower ring 44 of a bladder B, and a pressure charging/discharging port 48 for the bladder B, such that the vulcanized tire T together with the bladder B transported to just above the bladder attaching/detaching apparatus 24 as shown in FIG. 5(a) by the tire transferring apparatus 4 from the vulcanizing mold 14 or post-vulcanization treatment station 11 is displaced downward as shown in FIG. 5(b) to thereby fit the lower ring 44 of the bladder B onto the lower ring holder 45 of the apparatus 24 so that the bladder B together with the tire T is held by the apparatus 24, and to thereby penetrate the center post 42 of the apparatus 24 through an upper ring 47 of the bladder B by such an upward displacement, and then the upper ring 47 and center post 42 are interconnected by fastening means (not shown).

This allows a pressure charging/discharging port 46 provided in the lower ring holder 45 to be connected to the pressure charging/discharging port 48 provided in the lower ring 44 of the bladder B, so that the bladder internal pressure is discharged via respective charging/discharging ports 46, 48.

After or simultaneously with discharge of the internal pressure of the bladder B, the center post 42 of the apparatus 24 is further raised as shown in FIG. 6(a) to thereby lift the upper ring 47 by the tip end of the center post 42, so as to deform a balloon portion 49 from a toroidal shape into a cylindrical shape, thereby enabling the vulcanized tire T to be detached from the bladder B.

FIG. 6(b) shows a state where the tire T has been drawn out of the bladder B in the above-mentioned state. Such draw-out of the tire T is conducted by the manipulator 10, and this manipulator 10 thereafter positions and places the tire T onto the vulcanized tire placing stand 7 of the incoming and outgoing station 8. Then, this vulcanized tire T is taken out of the tire placing stand 7 at a required timing.

Meanwhile, the bladder B left on the bladder attaching/detaching apparatus 24 is normally to wait for a next usage. Upon next usage in this case, the green tire GT taken out of the green tire placing stand 6 of the incoming and outgoing station 8 by the other manipulator 9 is fitted from the position just above the bladder attaching/detaching apparatus 24 shown in FIG. 7(a) onto the balloon portion 49 shown in FIG. 7(b) such that the lower bead portion of the green tire GT is placed on the lower ring 44 of the bladder B, and the center post 42 of the apparatus 24 coupled to the upper ring 47 is directly lowered while simultaneously supplying a pressurizing fluid into the bladder B from the pressure charging/discharging port 46 of the lower ring holder 45, thereby inflating the bladder balloon portion 49 into a toroidal shape and fitting it into the inner surface of tire as shown in FIG. 7(c), and then the upper ring 47 is coupled to the lower ring 44 by pertinent means (not shown).

Thereafter, the coupling of the upper ring 47 to the center post 42 is released, thereby enabling the green tire GT attached with the bladder 27 to be taken out of the apparatus 24.

This takeout can be conducted by exemplarily gripping the green tire GT together with the bladder by the tire transferring apparatus 4, such that the green tire GT taken out of the apparatus 24 is then loaded into the vulcanizing mold 14 in the opened posture.

Thus, such takeout of the green tire GT also removes the bladder B from the bladder attaching/detaching apparatus 24, and the apparatus 24 reverts to the original state shown in FIG. 5(a).

In the tire vulcanizing system as described above, the green tire GT transported to the green tire placing stand 6 of the incoming and outgoing station 8 by transporting means (not shown) is taken into the bladder attaching/detaching apparatus 24 by the manipulator 9 and internally attached with the bladder B there, and then loaded into the vulcanizing mold 14 of any one of vulcanizing stations 2 by the tire transferring apparatus 4.

Meantime, each vulcanized tire T having been vulcanized in the vulcanizing mold 14 is taken out of the vulcanizing mold 14 in the opened posture by the associated tire transferring apparatus 4 and transferred to the post cure inflater 27 of the post-vulcanization treatment station 11, and after completion of PCI to be conducted there, taken into the bladder attaching/detaching apparatus 24 of the bladder attaching/detaching station 5 again under operation of the tire transferring apparatus 4. The bladder 27 is detached from the tire T there, and then the vulcanized tire T as a product tire is placed onto the tire placing stand 7 of the incoming and outgoing station 8 by the manipulator 10 and thereafter exemplarily carried out to a next process by the transporting means (not shown).

In this way, the plurality of vulcanizing stations 2 are disposed on the arc R1 also in this modified embodiment while disposing one set of tire transferring apparatus 4 of the swiveling arm type common to all the associated vulcanizing stations 2 at the central location of the arc R1, thereby enabling the occupying space and equipment cost of the vulcanizing system to be advantageously reduced, while disposing the tire transferring apparatus 4 sufficiently closely and equidistantly to the vulcanizing stations 2, thereby enabling an improved production efficiency without requiring a higher precision for the respective operating mechanism portions.

Moreover, the bladder attaching/detaching station 5 is disposed within the working area of the tire transferring apparatus 4, thereby enabling the remarkably reduced number of bladders to be attached into the tires outside the vulcanizing molds, while simultaneously enabling an occupying space to be advantageously reduced as a whole of the vulcanizing system compared with a situation for separately and independently providing a bladder attaching/detaching station.

Figure 8:
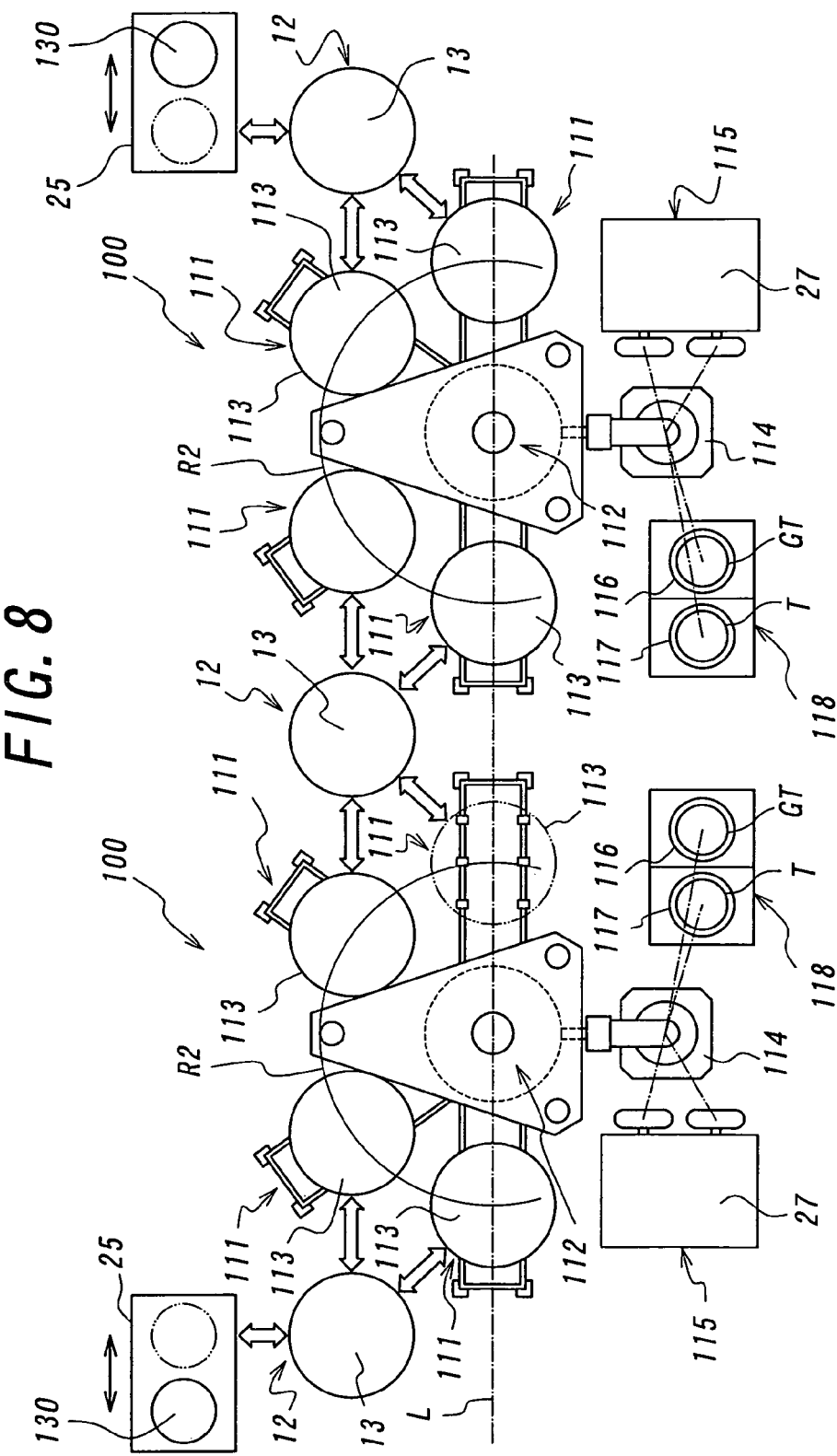
FIG. 8 is a schematic plan view showing a vulcanizing system according to a second embodiment of the present invention.

There will be explained hereinafter a tire vulcanizing system according to a second embodiment of the present invention on the basis of FIG. 8 through FIG. 13. FIG. 8 is a schematic plan view showing the vulcanizing system 100, in a situation where two sets of the same systems are disposed in a mutually neighbored manner. In each tire vulcanizing system 100, like reference numerals as used in the tire vulcanizing system 1 of the first embodiment are used to denote identical elements.

In each vulcanizing system 100, there are arranged one set of mold opening/closing station 112, and four sets of vulcanizing stations 111 mutually separated by 60° on an arc R2 about the center of the associated mold opening/closing closing station 112 and at one side of a straight line L connecting between the centers of the mold opening/closing stations 112 of two vulcanizing systems 100. There is provided a mold relaying station 12 outside the arc R2 and substantially equidistantly to at least two vulcanizing stations 111, while providing a mold taking-in/out apparatus 13 preferably of a turntable structure for taking a used vulcanizing mold out of the neighbored vulcanizing station 111 to the mold relaying station 12 and accommodating a next-use vulcanizing mold into the vulcanizing station 111. Note that the number of vulcanizing stations 111 and the distances among them are not limited to those shown in FIG. 8, and the number of stations and the distances can be appropriately set insofar as the plurality of vulcanizing stations 111 are placed on the arc R2.

Each vulcanizing system 100 is provided with four sets of mobile vulcanizing units 113 to be reciprocatedly displaced between four sets of vulcanizing stations 111 and the associated mold opening/closing station 12, respectively. FIG. 8 shows a state where only one of these four sets of mobile vulcanizing units 113 corresponding to the vulcanizing station 111 which is just right of the left side vulcanizing system 100, is displaced toward the mold opening/closing station side.

At a side opposite to an area where the vulcanizing stations 111 are arranged with respect to the straight line L of the mold opening/closing station 112, there is provided a mold-opening/closing-station-aimed tire transferring apparatus 114 for taking a vulcanized tire out of the mold opening/closing station 112 and for delivering a green tire into the mold opening/closing station 112. In the mold opening/closing station 112, the tire is housed within a mold in a posture where the central axis of the tire is vertical, and the tire transferring apparatus 114 takes the tire in this posture into and out of the mold opening/closing station 112.

Provided within an operation area of each tire transferring apparatus 114 is an incoming and outgoing station 118 juxtaposingly including: a green tire placing stand 116 for temporarily storing a green tire GT and for transferring it to the tire transferring apparatus 114; and a vulcanized tire placing stand 117 for receiving a vulcanized tire T from the tire transferring apparatus 114 and temporarily storing the tire. On the green tire placing stand 116 and vulcanized tire placing stand 117, the tires are emplaced in postures where the central axes are made vertical, respectively. Note that it is possible in this figure that the stands 116, 117 mutually neighbored in the fore-and-aft direction in the same plane are modified to be neighbored in the up-and-down direction or the right-and-left direction, and in either case, it is desirable to take a green tire GT onto the associated stand 116 and to take a vulcanized tire T out of the stand 117 by utilizing a belt conveyor or other taking out means (not shown).

Further preferably, post-vulcanization treatment stations 115 are provided within the working areas of the tire transferring apparatuses 114 additionally to the above, respectively, and each station 115 is provided with a post cure inflater 27 for applying PCI to a bladder-containing vulcanized tire T. Each post cure inflater 27 is capable of supporting four tires at four locations, respectively, so as to enable simultaneous application of PCI to four tires, and is constituted to support the tires in postures for horizontally keeping the central axes.

Since each tire transferring apparatus 114 is required to take a tire into and out of the mold opening/closing station 112, post-vulcanization treatment station 115, green tire placing stand 116 and vulcanized tire placing stand 117, with different postures of the tires at the respective positions, the tire transferring apparatus 114 is constituted of a multi-articulation type of robot, to thereby enable these complicated operations to be realized by a simplified mechanism.

Figure 9:
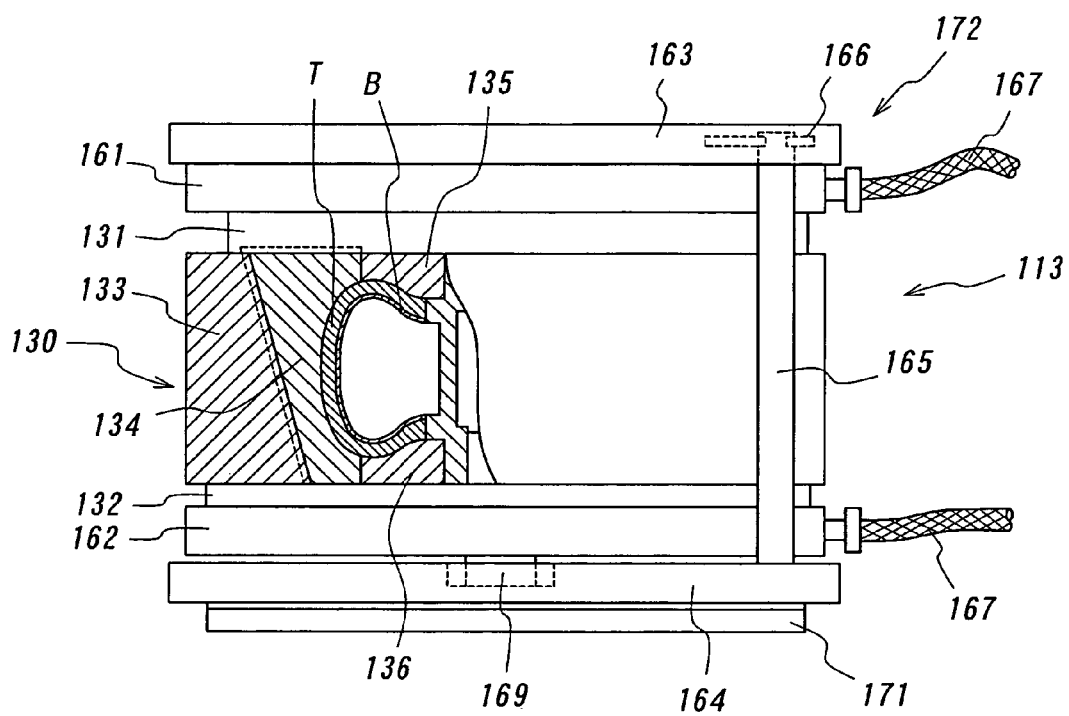
FIG. 9 is a side view showing a mobile vulcanizing unit.

There will be detailed hereinafter the stations constituting the tire vulcanizing system. FIG. 9 is a side view showing the mobile vulcanizing unit 113. This mobile vulcanizing unit 113 is provided with a vulcanizing mold 130 having a cavity for housing a tire T therein and a bladder B defining an inner surface shape of the tire T. It is possible to employ a hardcore made of rigid body as a vulcanization core, instead of the bladder.

The vulcanizing mold 130 comprises an upper mold-piece 131, a lower mold-piece 132 and a container 132, which combinedly define a cavity for housing a tire T therein, and these elements are separated from one another in the up-and-down direction to thereby enable the tire to be taken into and out of the cavity. Further, the lower mold-piece 132 comprises a lower side mold-piece 136 corresponding to one side portion of a tire, and the upper mold-piece 131 comprises an upper side mold-piece 135 corresponding to the other side portion of the tire and a plurality of segmented mold-pieces 134 which are movable in the radial direction and are circumferentially and mutually combined to define an annular shape so as to form an outer surface shape of a tread portion of the tire.

Further, the mobile vulcanizing unit 113 is provided with an upper platen 161 and a lower platen 162 which abut on opposite ends of the vulcanizing mold 130, respectively, and constitute heating platen portions, and these platens 161, 162 are connected with heating-medium supplying hoses 167 for supplying heating medium such as steam into heating medium jackets provided in the platens 161, 162 to thereby heat them, respectively. This heat is transmitted to the vulcanizing mold 130 abutting on the platens, thereby vulcanizing the tire.

Further, each mobile vulcanizing unit 113 is provided with: an upper end-plate 163 and a lower end-plate 164 for integrally clamping the vulcanizing mold 130 and the platens 161, 162 abutted on the both end surfaces of the mold 130, respectively; a plurality of tie-rods 165 for coupling these end-plates 163, 164 to each other; and a hydraulic jack 169 attached to the lower end-plate 164 so as to urge the vulcanizing mold 130 toward the upper end-plate 163 thereby clamping the vulcanizing mold 130; such that these end-plates 163, 164, tie-rods 165 and hydraulic jack 169 cooperate to constitute mold locking means for integrally clamping the vulcanizing mold 130 and upper and lower platens 161, 162.

Moreover, lower tip ends of the tie-rods 165 are fixed to the lower end-plate 164 and upper tip ends of the tie-rods 165 are engaged with the upper end-plate 163 via tie-plate 166, and the tie-plate 166 is constituted such that the tie-plate 166 can be turned around the axis of the vulcanizing mold so as to engage the tie-rods 165 with the upper end-plate 163 and to release this engagement.

The upper mold-piece 131, upper platen 161, upper end-plate 163 and tie-plate 166 constitute a rising/lowering unit portion 172 to be integrally moved when the upper end-plate 163 is lifted up.

Figure 10:
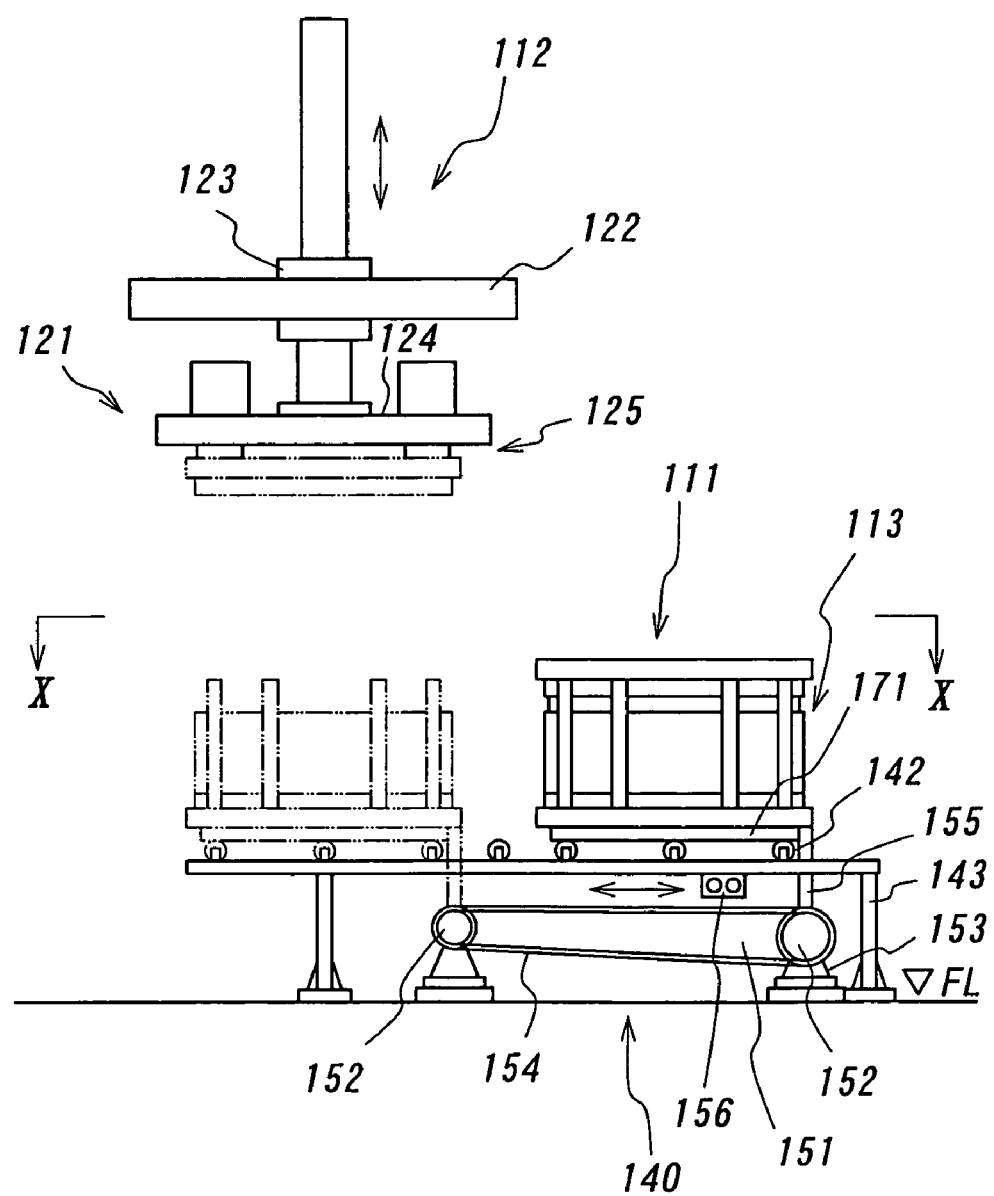
FIG. 10 is a front view showing a vulcanizing station and a mold opening/closing station.
Figure 11:
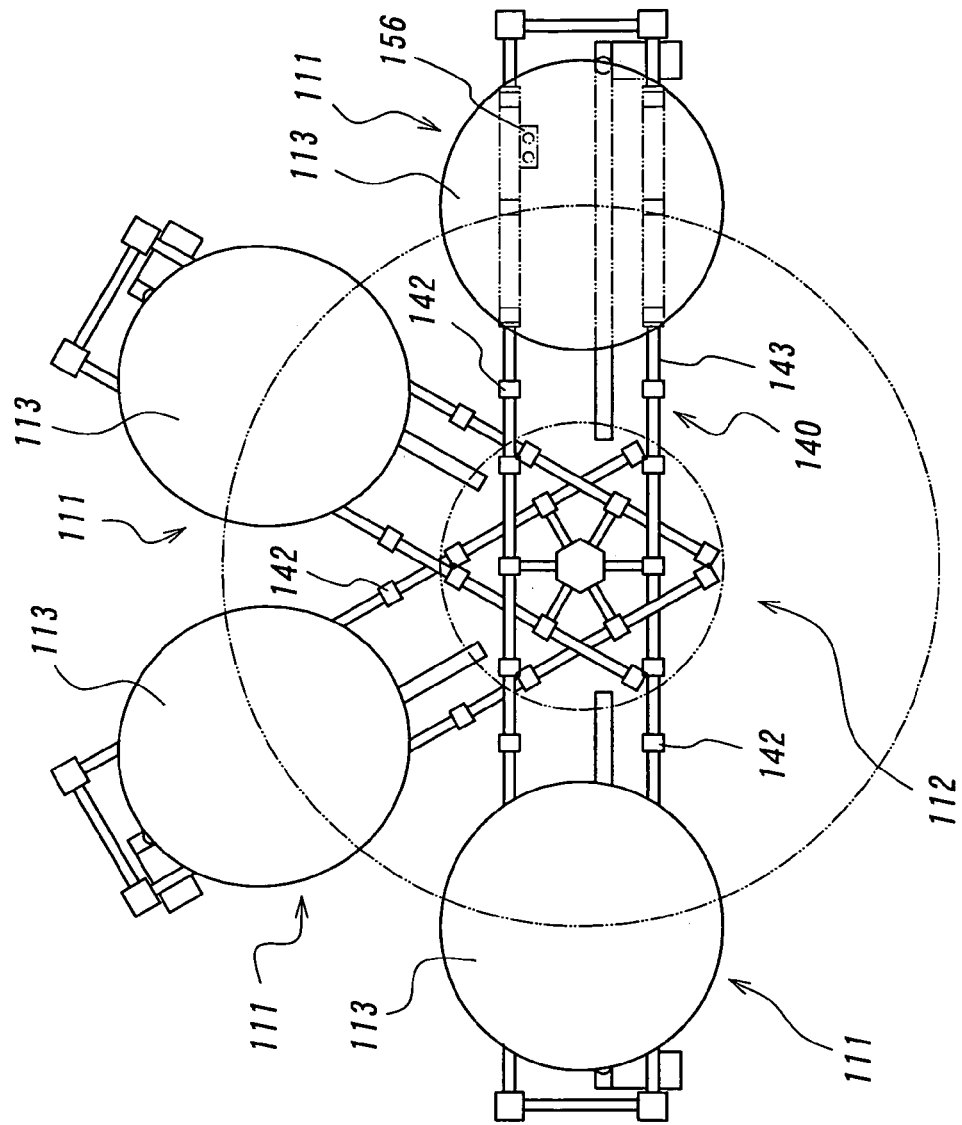
FIG. 11 is a plan view showing the vulcanizing station and the mold opening/closing station.

There will be explained hereinafter each vulcanizing station 111 and each mold opening/closing station 112. FIG. 10 is a front view showing one set of mold opening/closing station 112 and one set of vulcanizing station 111 provided oppositely thereto in each vulcanizing system 100 of FIG. 8, and FIG. 11 is a plan view in an X-X arrow direction of FIG. 10, in a manner to show all of four sets of vulcanizing stations 111 arranged around the mold opening/closing station 112.

Each vulcanizing station 111 is provided with a vulcanizing unit reciprocative driving apparatus 140, which includes a heating-medium supplying port 156 for supplying a heating medium and which reciprocatingly displaces the associated mobile vulcanizing unit 113 between the vulcanizing station 111 itself and the associated mold opening/closing station 112.

This vulcanizing unit reciprocative driving apparatus 140 is constituted of a vulcanizing unit driving part 151 and a vulcanizing unit supporting/guiding part 141, and the vulcanizing unit driving part 151 is provided with a driving bar 155 fixed to one link of a link chain 154 spanned between two sprockets 152 and driven by a motor 153. The tip end of the driving bar 155 can be detachably coupled to a rearmost portion of the mobile vulcanizing unit 113, i.e., to a portion positioned opposite to the mold opening/closing station 112 by coupling means (not shown), and the mobile vulcanizing unit 113 can be reciprocatedly displaced by reciprocatingly displacing the link chain 154 by driving the motor 153.

The vulcanizing unit supporting/guiding part 141 comprises a plurality of rollers 142 and a roller stand 143 for supporting them, and these rollers 142 are arranged in two rows between the associated vulcanizing station 111 and mold opening/closing station 112 and parallelly to a straight line connecting these stations. Meanwhile, the mobile vulcanizing unit 113 is attached at its lower surface with two guide rails 171 parallel to the traveling direction, and these guide rails 171 are moved on and along the associated rows of rollers 142, thereby enabling the mobile vulcanizing unit 113 to be reciprocatedly displaced relative to the mold opening/closing station 112.

As described above, the vulcanizing unit supporting/guiding part 141 of the vulcanizing unit reciprocative driving apparatus 140 is constituted of rollers 142 having short axes and laid over the moving region of the mobile vulcanizing unit 113, thereby enabling realization of the vulcanizing system 100 which is extremely simple with a reduced cost as shown in FIG. 11.

Moreover, as shown in FIG. 11, the vulcanizing unit supporting/guiding parts 141 and the mobile vulcanizing units 113 can be provided without interference between vulcanizing unit supporting/guiding parts 141 and between the vulcanizing unit supporting/guiding part 141 and other mobile vulcanizing unit 113, even at the mold opening/closing station 112 and in the vicinity thereof where the vulcanizing unit reciprocative driving apparatuses 140 are crossed each other.

Since the mobile vulcanizing unit 113 can be moved in a state where the heating-medium supplying hoses 167 for supplying the heating medium from the heating-medium supplying port 156 are kept connected to the upper and lower platens 161, 162 of the mobile vulcanizing unit 113, thereby enabling a continued vulcanization even during movement of the mobile vulcanizing unit 113, so that this moving time is utilized as a part of vulcanizing time to the utmost, to thereby enable a correspondingly shortened cycle time, a reduced equipment cost, and a reduced risk of heating medium leakage from the connecting portions.

As shown in FIG. 10, the mold opening/closing station 112 is provided at its center with a center mold opening/closing apparatus 121 for rising and lowering the rising/lowering unit portion 172 of the mobile vulcanizing unit 113 having been moved to the station 112. This mold opening/closing apparatus 121 comprises a base 122 fixed via column built from a floor surface, and an up/down unit 124 to be guided by a guide 123 attached to the base 122 and to be moved up and down by a driving apparatus (not shown). This up/down unit 124 is provided with a rising/lowering unit portion locking/gripping mechanism 125 for rotating the tie-plate 166 of the associated mobile vulcanizing unit 113, so as to couple and decouple the upper end-plate 163 to and from the tie-rods 165 and to grip and release the upper end-plate 163.

There will be explained hereinafter a series of operations of this tire vulcanizing system, from receipt of a green tire GT from a preceding process, through vulcanization, and up to delivery of a vulcanized tire T to a succeeding process. The green tire GT transported from the preceding process is placed on the green tire placing stand 116. Meantime, the tire transferring apparatus 14 transfers the vulcanized tire T from the vulcanizing mold 130 opened upward and downward at the mold opening/closing station 112 to the post-vulcanization treatment station 115, and then takes up the green tire GT placed on the green tire placing stand 116 and sets the tire to the opened vulcanizing mold 130 positioned at the mold opening/closing station 112.

After the tire transferring apparatus 114 is withdrawn, the mold opening/closing apparatus 121 is lowered to thereby lower the rising/lowering unit portion 172 of the mobile vulcanizing unit 113, and the rising/lowering unit portion locking/gripping mechanism 125 and the hydraulic jack 169 are operated to thereby lock the rising/lowering unit portion 172 to the other portions of the mobile vulcanizing unit 113.

Thereafter, this mobile vulcanizing unit 113 is moved to the associated vulcanizing station 111 by the associated vulcanizing unit reciprocative driving apparatus 140, and the green tire GT housed in the mobile vulcanizing unit 113 is vulcanized at the vulcanizing station 111. Upon completion of vulcanization, the mobile vulcanizing unit 113 is moved to the mold opening/closing station 112 by the vulcanizing unit reciprocative driving apparatus 140, and then the vulcanizing mold 130 is opened by the mold opening/closing apparatus 121 of the mold opening/closing station 112 into a state where the vulcanized tire T can be taken out of the vulcanizing mold 130.

After the vulcanized tire T is transferred from the mold opening/closing station 112 to the post-vulcanization treatment station 115 by the tire transferring apparatus 114 and the treatment of PCI is completed, the vulcanized tire T is again taken out of the post-vulcanization treatment station 115 by the tire transferring apparatus 114 and placed onto the vulcanized tire placing stand 117. Thereafter, this tire T is transported to the next process.

Note that the mold relaying stations 12 and mold taking-in/out apparatuses 13 in the vulcanizing system of this embodiment are the same as those of the first embodiment which are denoted by the same reference numerals, so that the detailed description of the former shall be omitted.

Although the tire vulcanizing system of this embodiment adopts materials such as nylon having higher heat shrinkage rates as cords constituting a tire to be vulcanized and thus the vulcanizing system is provided with the post-vulcanization treatment station 115 for applying the PCI treatment, this post-vulcanization treatment station 115 can be omitted in case of a vulcanizing system for vulcanizing a tire comprising cords of materials having lower heat shrinkage rates.

Although attachment and detachment of a bladder or rigid core to and from a tire is assumed to be conducted outside the tire vulcanizing system 100 shown in FIG. 8, it is alternatively possible to provide one set of station for attaching/detaching a bladder to/from a tire within the vulcanizing system such that attachment and detachment of bladders are intensively conducted in the vulcanizing system, and it becomes possible in this case to reduce the equipment cost by the intensive bladder attachment and detachment, and to shorten the time during which the bladder is attached to the tire as compared with a situation for conducting the attachment and detachment of the bladder outside the system, thereby enabling the largely reduced number of required bladders.

Figure 12:
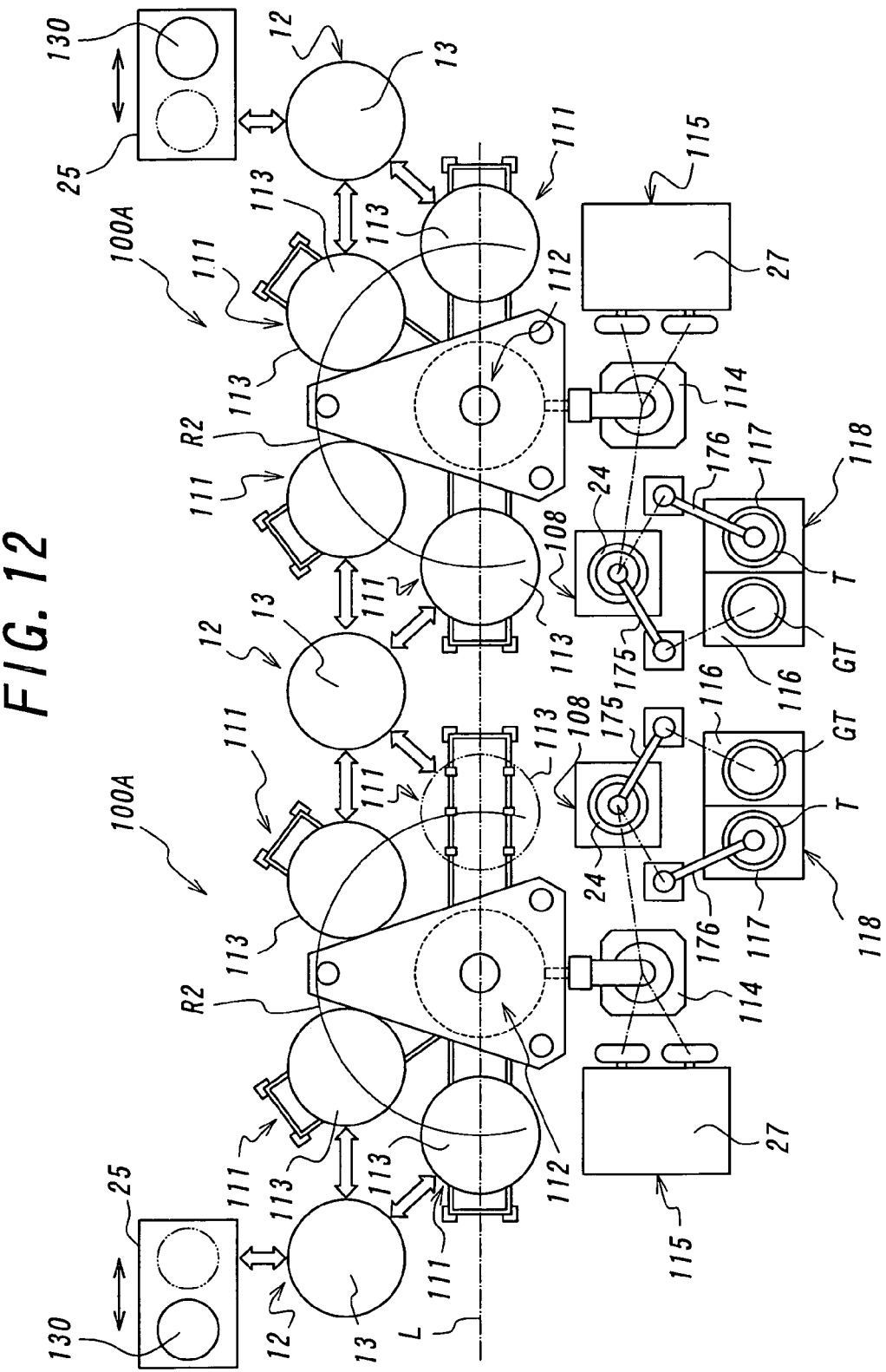
FIG. 12 is a schematic plan view showing a modified embodiment of the vulcanizing system of the second embodiment.

FIG. 12 is a schematic plan view showing a tire vulcanizing system 100A as a modified embodiment of the second embodiment, provided with such a bladder attaching/detaching station 108, in a situation where two sets of the same tire vulcanizing systems 100A are disposed in a mutually neighbored manner. In each tire vulcanizing system 100A, like reference numerals are used for parts which are the same as those in the tire vulcanizing system 100, respectively.

In each vulcanizing system 100A, there are arranged one set of mold opening/closing station 112, and four sets of vulcanizing stations 111 mutually separated by 60° on an arc R2 about the center of the associated mold opening/closing station 112 and at one side of a straight line L connecting between the centers of the mold opening/closing stations 112 of two vulcanizing systems 100A. There is provided a mold relaying station 12 outside the arc R2 and substantially equidistantly to at least two vulcanizing stations 111, while providing a mold taking-in/out apparatus 13 preferably of a turntable structure for taking a used vulcanizing mold out of the neighbored vulcanizing station 111 to the mold relaying station 12 and accommodating a next-use vulcanizing mold into the vulcanizing station 111.

Each vulcanizing system 100A is provided with four sets of mobile vulcanizing units 113 to be reciprocatedly displaced between four sets of vulcanizing stations 111 and the associated mold opening/closing station 112, respectively. FIG. 12 shows a state where only one of these four sets of mobile vulcanizing units 113 corresponding to the vulcanizing station 111 which is just right of the left side vulcanizing system 100A, is displaced toward the mold opening/closing station side.

At a side opposite to an area where the vulcanizing stations 111 are arranged with respect to the straight line L of the mold opening/closing station 112, there is provided a mold-opening/closing-station-aimed tire transferring apparatus 114 for taking a vulcanized tire out of the mold opening/closing station 112 and for delivering a green tire into the mold opening/closing station 112. In the mold opening/closing station 112, the tire is housed within a mold in a posture where the central axis of the tire is vertical, and the tire transferring apparatus 114 takes the tire in this posture into and out of the mold opening/closing station 112.

Provided within an operation area of each tire transferring apparatus 114 are a bladder attaching/detaching station 108 provided with a bladder attaching/detaching apparatus 24 for attaching a bladder to a green tire GT and detaching a bladder from a vulcanized tire T, and an incoming and outgoing station 118 juxtaposingly including: a green tire placing stand 116 for temporarily storing a bladder-unattached green tire GT and for transferring it to the tire transferring apparatus 114; and a vulcanized tire placing stand 117 for receiving a bladder-detached vulcanized tire T from the tire transferring apparatus 114 and temporarily storing the tire; while providing at least one set, and two sets in the drawing, of manipulators 175, 176 between these stations 108, 118, for transferring tires GT, T to the stations 108, 118, respectively.

Note that it is possible in this figure that the stands 116, 117 mutually neighbored in the fore-and-aft direction in the same plane are modified to be neighbored in the up-and-down direction or the right-and-left direction, and in either case, it is desirable to take a green tire GT onto the associated stand 116 and to take a vulcanized tire T out of the stand 117 by utilizing a belt conveyor or other taking out means (not shown).

Further preferably, post-vulcanization treatment stations 115 are provided within the working areas of the tire transferring apparatuses 114 additionally to the above, respectively, and each station 115 is provided with a post cure inflater 27 for applying PCI to a bladder-containing vulcanized tire T. Each post cure inflater 27 is capable of supporting four tires at four locations, respectively, so as to enable simultaneous application of PCI to four tires, and is constituted to support the tires in postures for horizontally keeping the central axes. On the bladder attaching/detaching station 108, green tire placing stand 116 and vulcanized tire placing stand 117, the tires are emplaced in postures where the central axes are made vertical, respectively.

Here, each vulcanizing station 111 has been explained in detail on the basis of FIG. 9 and FIG. 10, and so do the mold relaying station 12 and mold taking-in/out apparatus 13 and the bladder attaching/detaching station 108 on the basis of FIG. 3 and FIG. 5 through FIG. 7, respectively, so that the detailed description thereof shall be omitted. Further, the mold-opening/closing-station-aimed tire transferring apparatus 114, post-vulcanization treatment station 115 and incoming and outgoing station 118 have been described above, so that the detailed description thereof shall be omitted.

There will be explained hereinafter a series of operations of this tire vulcanizing system as the modified embodiment of the second embodiment with reference to FIG. 12, from receipt of a green tire GT from a preceding process, through completion of vulcanization, and up to delivery of a vulcanized tire T to a succeeding process.

The green tire T transported from the preceding process is placed on the green tire placing stand 116. After this green tire T is transferred to the bladder attaching/detaching station 108 by the manipulator 175, there is attached a bladder into this tire T at the bladder attaching/detaching station 108 and then the green tire GT attached with the bladder is transferred to the mold opening/closing station 112 by the tire transferring apparatus 114, at which time the mobile vulcanizing unit 113 from which the vulcanized tire T has been taken out is waiting in a state opening its vulcanizing mold 130 at the mold opening/closing station 112, so that a green tire GT is set into this vulcanizing mold 130.

After the tire transferring apparatus 114 is withdrawn from the mold opening/closing station, the mold opening/closing apparatus 121 is lowered to thereby lower the rising/lowering unit portion 172 of the mobile vulcanizing unit 113, and the rising/lowering unit portion locking/gripping mechanism 125 and the hydraulic jack 169 are operated to thereby lock the rising/lowering unit portion 172 to the other portions of the mobile vulcanizing unit 113.

Thereafter, this mobile vulcanizing unit 113 is moved to the associated vulcanizing station 111 by the associated vulcanizing unit reciprocative driving apparatus 140, and the green tire GT housed in the mobile vulcanizing unit 113 is vulcanized at the vulcanizing station 111. Upon completion of vulcanization, the mobile vulcanizing unit 113 is moved to the mold opening/closing station 112 by the vulcanizing unit reciprocative driving apparatus 140, and then the vulcanizing mold 130 is opened by the mold opening/closing apparatus 121 of the mold opening/closing station 12 into a state where the vulcanized tire T can be taken out of the vulcanizing mold 130.

Thereafter, the vulcanized tire T is transferred from the mold opening/closing station 112 to the post-vulcanization treatment station 115 by the tire transferring apparatus 114, and this tire is applied with a PCI treatment at the post-vulcanization treatment station 115. After completing the PCI treatment, the vulcanized tire T is again taken out of the post-vulcanization treatment station 115 by the tire transferring apparatus 114, and transferred to the bladder attaching/detaching station 108.

At the bladder attaching/detaching station 108, the bladder attached to the vulcanized tire T is detached therefrom, and this tire T is placed on the vulcanized tire placing stand 117 by the manipulator 176 and this tire 5 is then transported to the next process.

Figure 13:
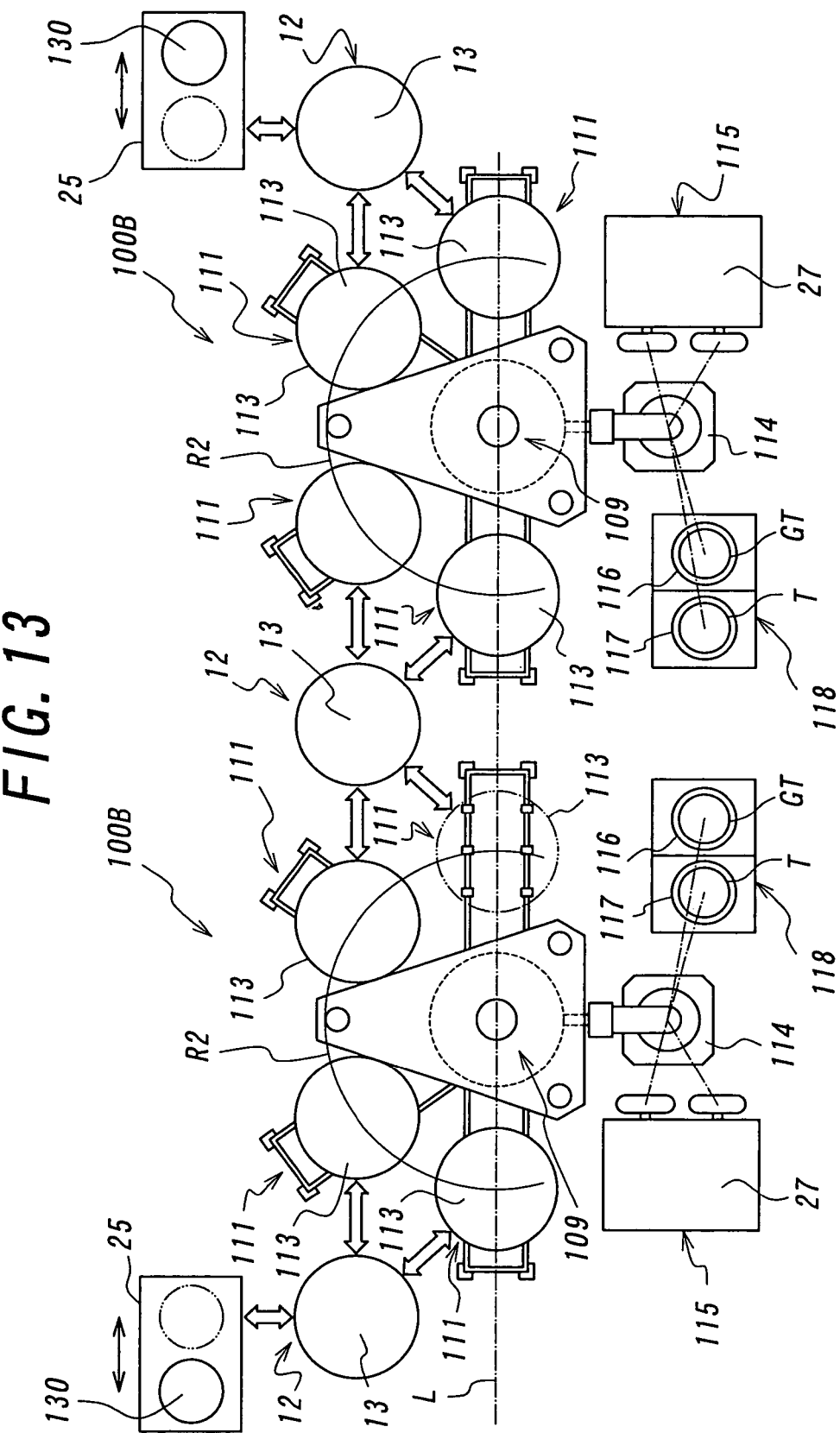
FIG. 13 is a schematic plan view showing another modified embodiment of the vulcanizing system of the second embodiment.

There will be explained hereinafter another modified example of the second embodiment with reference to FIG. 13. FIG. 13 is a schematic plan view showing a vulcanizing system 100B, in a situation where two sets of the same tire vulcanizing systems 100B are disposed in a mutually neighbored manner. In each tire vulcanizing system 100B, like reference numerals as used in the tire vulcanizing system 100 are used to denote identical elements.

In each vulcanizing system 100B, there are arranged: a bladder-attaching/detaching-apparatus-provided mold opening/closing station 109 provided with a bladder attaching/detaching apparatus 24 for attaching a bladder to a green tire GT and for detaching a bladder from a tire T, and a center mold opening/closing apparatus for opening and closing the vulcanizing mold 130; and four sets of vulcanizing stations 111 mutually separated by 60° on an arc R2 about the center of the associated bladder-attaching/detaching-apparatus-provided mold opening/closing station 109 and at one side of a straight line L connecting between the centers of the bladder-attaching/detaching-apparatus-provided mold opening/closing station 109 of two vulcanizing systems 100B. There is provided a mold relaying station 12 outside the arc R2 and substantially equidistantly to at least two vulcanizing stations 2, while providing a mold taking-in/out apparatus 13 preferably of a turntable structure for taking a used vulcanizing mold out of the neighbored vulcanizing station 111 to the mold relaying station 12 and accommodating a next-use vulcanizing mold into the vulcanizing station 111.

Each vulcanizing system 100B is provided with four sets of mobile vulcanizing units 113 to be reciprocatedly displaced between four sets of vulcanizing stations 111 and the associated bladder-attaching/detaching-apparatus-provided mold opening/closing station 109, respectively. FIG. 12 shows a state where only one of these four sets of mobile vulcanizing units 113 corresponding to the vulcanizing station 111 which is just right of the left side vulcanizing system 100B, is displaced toward the bladder-attaching/detaching-apparatus-provided mold opening/closing station side.

At a side opposite to an area where the vulcanizing stations 111 are arranged with respect to the straight line L of the bladder-attaching/detaching-apparatus-provided mold opening/closing station 109, there is provided a mold-opening/closing-station-aimed tire transferring apparatus 114 for taking a vulcanized tire T out of the bladder-attaching/detaching-apparatus-provided mold opening/closing station 109 and for delivering a green tire GT into the bladder-attaching/detaching-apparatus-provided mold opening/closing station 109. In the bladder-attaching/detaching-apparatus-provided mold opening/closing station 109, the tire is housed within a mold in a posture where the central axis of the tire is vertical, and the tire transferring apparatus 114 takes the tire in this posture into and out of the bladder-attaching/detaching-apparatus-provided mold opening/closing station 109.

Provided within an operation area of each tire transferring apparatus 114 is an incoming and outgoing station 118 juxtaposingly including: a green tire placing stand 116 for temporarily storing a bladder-unattached green tire GT and for transferring it to the tire transferring apparatus 114; and a vulcanized tire placing stand 117 for receiving a bladder-detached vulcanized tire T from the tire transferring apparatus 114 and temporarily storing the tire.

Note that it is possible in this figure that the stands 116, 117 mutually neighbored in the fore-and-aft direction in the same plane are modified to be neighbored in the up-and-down direction or the right-and-left direction, and in either case, it is desirable to take a green tire GT onto the associated stand 116 and to take a vulcanized tire T out of the stand 117 by utilizing a belt conveyor or other taking out means (not shown).

Further preferably, post-vulcanization treatment stations 115 are provided within the working areas of the tire transferring apparatuses 114 additionally to the above, respectively, and each station 115 is provided with a post cure inflater 27 for applying PCI to a bladder-detached vulcanized tire T. Each post cure inflater 27 is capable of supporting four tires at four locations, respectively, so as to enable simultaneous application of PCI to four tires, and is constituted to support the tires in postures for horizontally keeping the central axes. On the green tire placing stand 116 and vulcanized tire placing stand 117, the tires are emplaced in postures where the central axes are made vertical, respectively.

Figure 6:
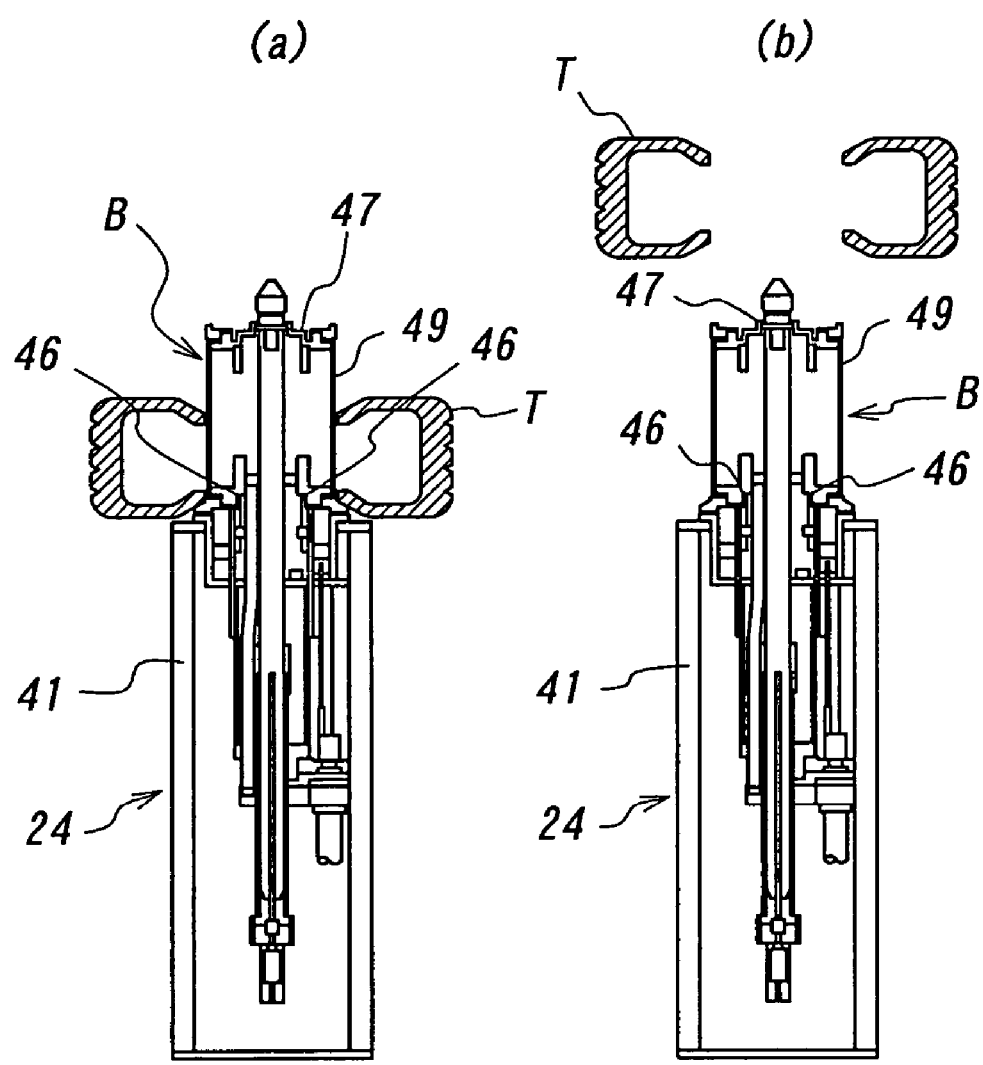
FIG. 6 is a longitudinal cross-sectional view showing the bladder attaching/detaching apparatus and the operation thereof.
Figure 7:
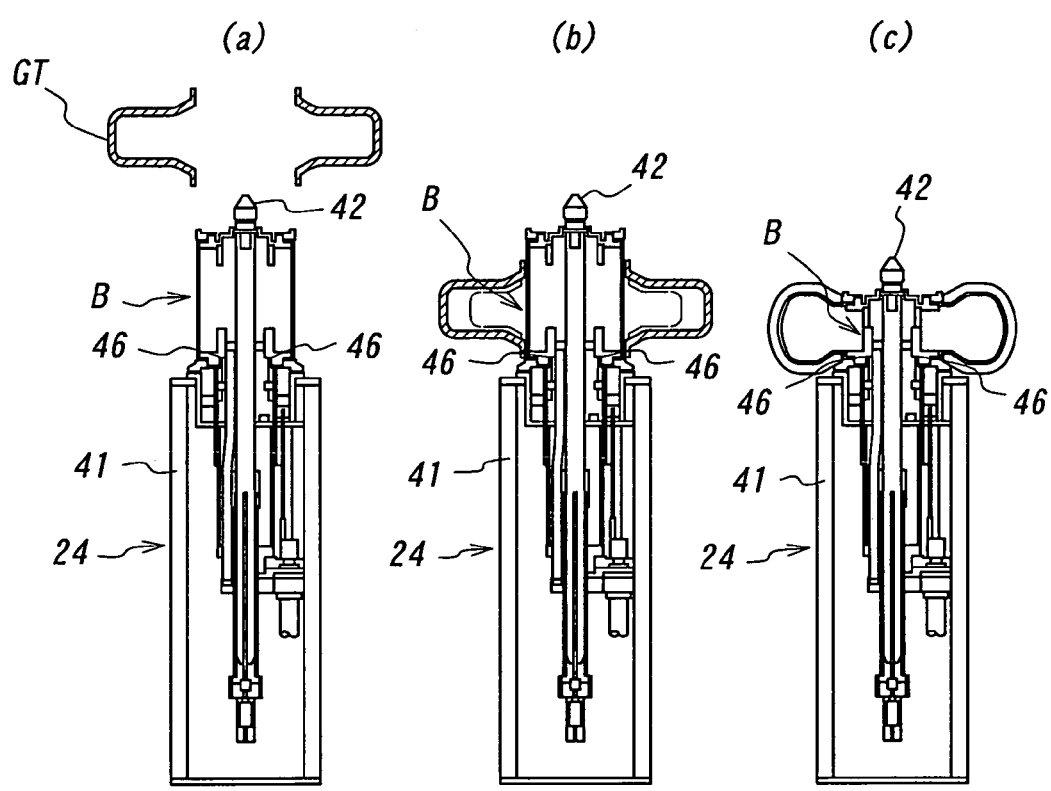
FIG. 7 is a longitudinal cross-sectional view showing the bladder attaching/detaching apparatus and another operation thereof.

As compared with the previous modified embodiment of the second embodiment in which the bladder attaching/detaching apparatus 24 has been arranged in the bladder attaching/detaching station 108, the bladder attaching/detaching apparatus 24 is arranged in the bladder-attaching/detaching-apparatus-provided mold opening/closing station 109 in this modified embodiment. This bladder-attaching/detaching-apparatus-provided mold opening/closing station 109 comprises: the mold opening/closing station 112 shown in FIG. 10; and the bladder attaching/detaching apparatus 24, the details of which are shown in FIG. 5 through FIG. 7, disposed just below the mold opening/closing station 112, in a central axis aligning manner.

The bladder attaching/detaching apparatus 24 is provided such that, upon moving each mobile vulcanizing unit 113 into and out of the center of the station 109, the bladder attaching/detaching apparatus 24 is lowered down to a height non-interfering with the mobile vulcanizing unit 113, and when the mobile vulcanizing unit 113 is left to stand on the center of the station 109, the lower ring holder 45 of the bladder attaching/detaching apparatus 24 can be raised and fitted onto the lower ring 44 of the bladder B of the mobile vulcanizing unit 113. In this case, the mobile vulcanizing unit 113 is required to be provided with a through-hole capable of passing the lower ring holder 45 and center post 42 of the bladder attaching/detaching apparatus 24 through the central portion of the bladder B from the below.

The used vulcanizing station 111, mold relaying station 12, mold taking-in/out apparatus 13, mold-opening/closing-station-aimed tire transferring apparatus 114, post-vulcanization treatment station 115, incoming and outgoing station 118 and other apparatuses are the same as those in the previous modified embodiment, so that the detailed description thereof shall not be repeated for simplifying the explanation.

There will be explained hereinafter a series of operations of this tire vulcanizing system 100B of the modified embodiment, from receipt of a green tire GT from a preceding process, through completion of vulcanization, and up to delivery of a vulcanized tire T to a succeeding process. The green tire T transported from the preceding process is placed onto the green tire placing stand 116. Meantime, the tire transferring apparatus 114 transfers the vulcanized tire T, from which the bladder B has been detached by the bladder attaching/detaching apparatus 24 at the bladder-attaching/detaching-apparatus-provided mold opening/closing station 109, to the post-vulcanization treatment station 115 from the opened vulcanizing mold 130 upward and downward, and then the tire transferring apparatus 114 takes up the green tire GT placed on the green tire placing stand 116 and transfers it to the bladder-attaching/detaching-apparatus-provided mold opening/closing station 109 to thereby set the tire into the opened vulcanizing mold 130 in a waiting state.

Then, after the tire transferring apparatus 114 is withdrawn from the bladder-attaching/detaching-apparatus-provided mold opening/closing station 109, the bladder B is attached to the green tire GT to thereby make the tire T into a toroidal shape by the bladder attaching/detaching apparatus 24, and thereafter the mold opening/closing apparatus 121 is lowered to thereby lower the rising/lowering unit portion 172 of the mobile vulcanizing unit 113 while operating the rising/lowering unit portion locking/gripping mechanism 125 and the hydraulic jack 169, thereby locking the rising/lowering unit portion 172 to other portions of the mobile vulcanizing unit 113.

Thereafter, this mobile vulcanizing unit 113 is moved to the associated vulcanizing station 111 by the vulcanizing unit reciprocative driving apparatus 140, and the green tire GT housed in the unit 113 is vulcanized at the vulcanizing station 111. Upon completion of vulcanization, the mobile vulcanizing unit 113 is moved to the bladder-attaching/detaching-apparatus-provided mold opening/closing station 109 by the vulcanizing unit reciprocative driving apparatus 140, and thereafter the vulcanizing mold 130 is opened by the mold opening/closing apparatus 121 of the bladder-attaching/detaching-apparatus-provided mold opening/closing station 109 so as to detach the bladder B from the vulcanized tire T by the bladder attaching/detaching apparatus 24.

This vulcanized tire T is transferred from the bladder-attaching/detaching-apparatus-provided mold opening/closing station 109 to the post-vulcanization treatment station 115 by the tire transferring apparatus 114, and this tire is applied with a PCI treatment at the post-vulcanization treatment station 115. After completion of the PCI treatment, the vulcanized tire T is again taken out of the post-vulcanization treatment station 115 by the tire transferring apparatus 114, and is placed onto the vulcanized tire placing stand 117. Thereafter, this tire T is transported to a next process.

Although the vulcanized tire T is PCI treated as the bladder-B-attached tire T in the previous modified embodiment, the vulcanized tire T is to be PCI treated in a bladder-B-unattached state in this modified embodiment.

Figure 14:
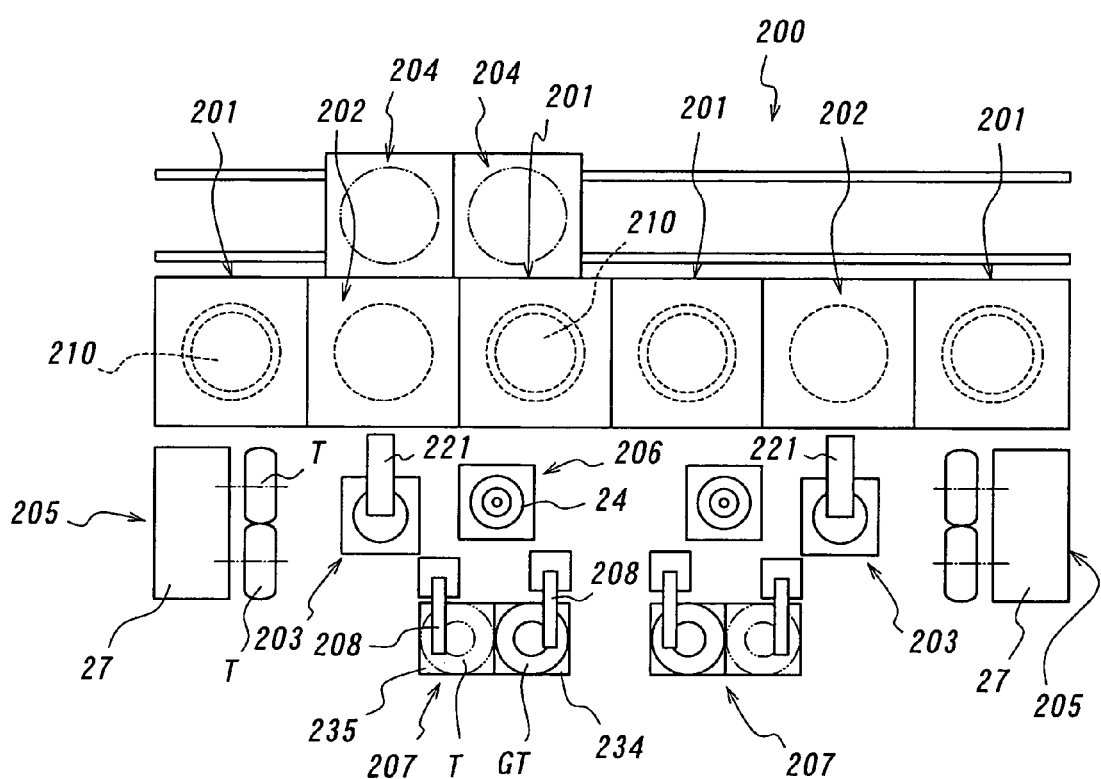
FIG. 14 is a schematic plan view showing a vulcanizing system according to a third embodiment of the present invention.
Figure 15:
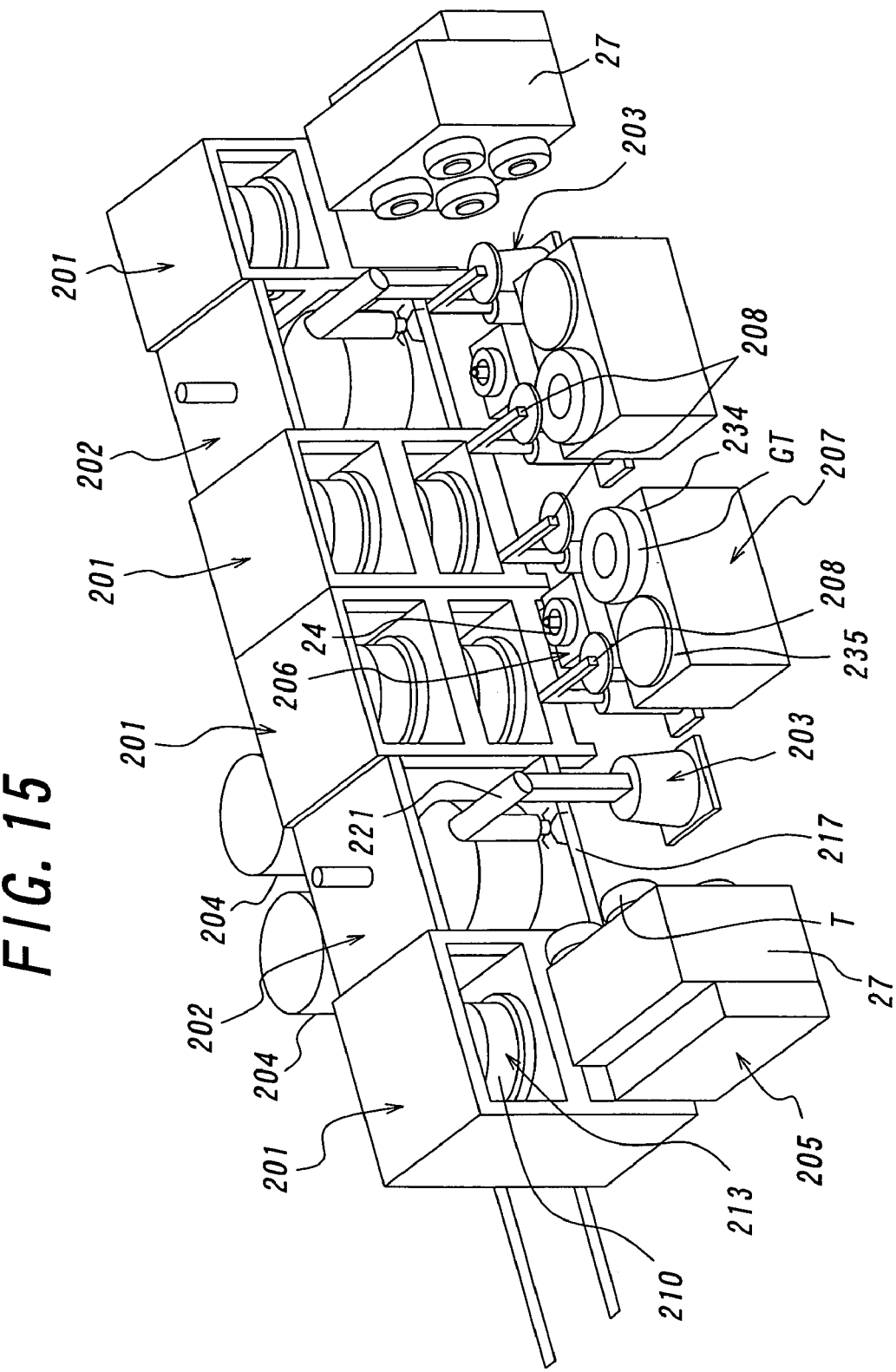
FIG. 15 is a perspective view of FIG. 14.

There will be explained hereinafter a tire vulcanizing system according to a third embodiment of the present invention on the basis of FIG. 14 through FIG. 19. FIG. 14 is a schematic plan view of this embodiment of the present invention in a situation where two sets of the same tire vulcanizing systems 200 are disposed in a mutually neighbored manner, and FIG. 15 is a perspective view of FIG. 14.

Here, there are provided: two sets of vulcanizing stations 201, for example, separately from each other on a straight line, each vulcanizing station being provided with vertically arranged multiple stages, such as two stages, of vulcanizing presses to be detailed later; one set of mold opening/closing station 202 positioned between and neighbored to both of these vulcanizing stations 201; a mold-opening/closing-station-aimed tire transferring apparatus 203 provided at one side of the mold opening/closing station 202, so as to take a tire into and out of a vulcanizing mold within the mold opening/closing station 202; and mold taking-in/out apparatuses 204 at the other side of the station 202, commonly to both vulcanizing stations 201 in this figure.

In the figures, reference numeral 205 designates a post-vulcanization treatment station provided within the working area of the associated tire transferring apparatus 203 and reference numeral 206 designates a bladder attaching/detaching station provided within the working area of the associated tire transferring apparatus 203, at one side of the associated mold opening/closing station 202.

Further, reference numeral 207 designates an incoming and outgoing station provided adjacent to the bladder attaching/detaching station 206, and transference of tires between the incoming and outgoing station 7 and bladder attaching/detaching station 206 is conducted by at least one set, and two sets in the drawings, of single-purpose manipulators 208.

Figure 16:
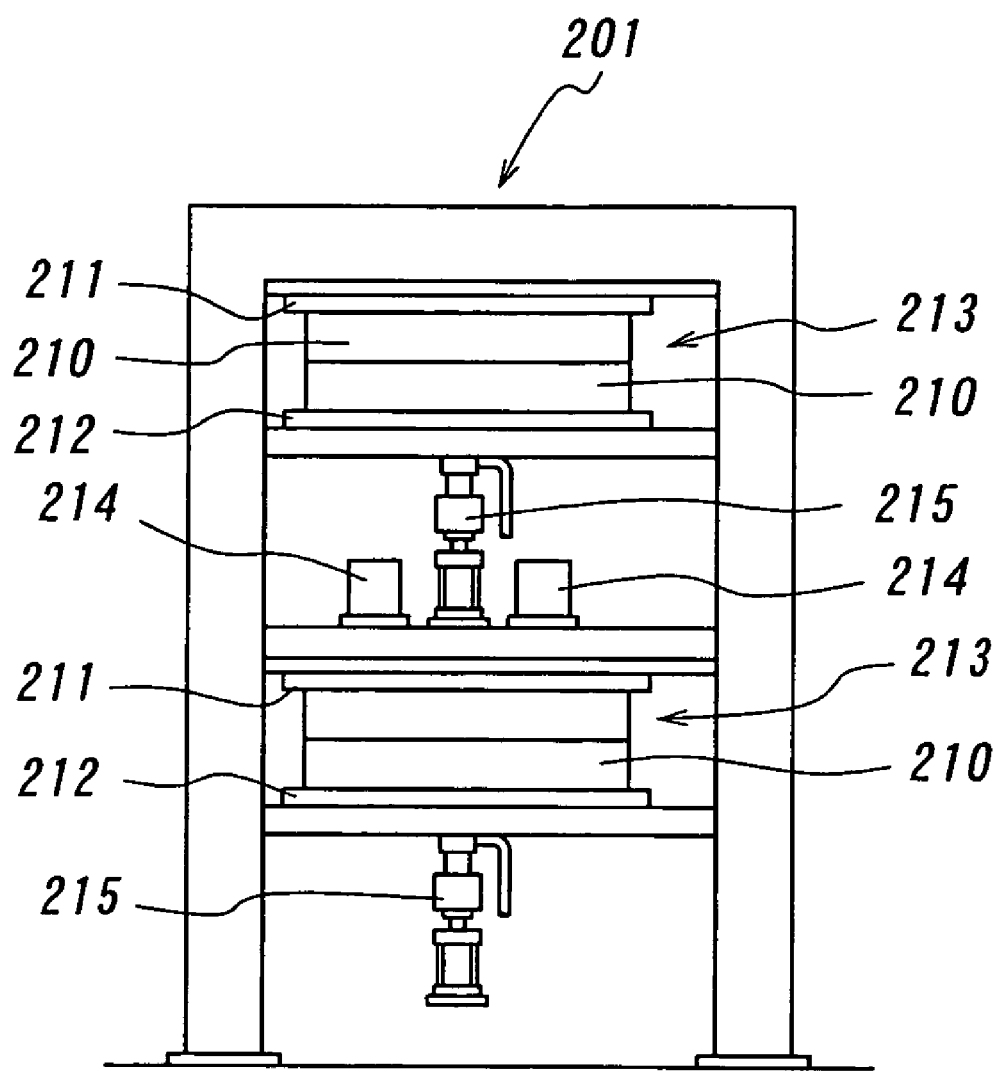
FIG. 16 is a front view of a vulcanizing station.

As shown in the front view of FIG. 16, each vulcanizing station 201 herein is exemplarily provided with upper and lower two levels of vulcanizing presses 213 each including an accommodating space for a vulcanizing mold 201 and including upper and lower platens 211, 212 for clamping the vulcanizing mold 210 from the above and below to thereby heat it, and each vulcanizing press 213 is additionally and exemplarily provided with: tightening cylinders 214 for urging the upper platen 211 to the vulcanizing mold 210 arranged on the lower platen 212; and a joint cylinder 215, for example, for enabling supply of pressurizing/heating medium to a bladder attached in a green tire within the vulcanizing mold 10.

Upon vulcanization molding of a green tire, such a vulcanizing press 213 is to urge the vulcanizing mold 210 from the above under operation of the tightening cylinders 214 as shown in FIG. 17(a), to thereby clamp the vulcanizing mold 210 and simultaneously flow a pressurizing/heating medium into a cavity of a bladder B through the joint cylinder 215 to thereby circulate the medium within the cavity.

After finishing the vulcanization molding, the upper platen 211 is lifted to thereby release the restraint on the vulcanizing mold 210 as shown in FIG. 4(b), and the heating-medium supplying port is separated from the bladder under operation of the joint cylinder 215 to thereby release the communication of the bladder with the heating-medium supplying source.

Under such a state of the vulcanizing press 213, the vulcanizing mold 210 can be taken out of the vulcanizing press 213 such as into the rightward direction in the drawing, and the vulcanizing press 213, from which the vulcanizing mold 210 has been taken out, is to wait for insertion and delivery of a next vulcanizing mold settled with a green tire into a position between the sufficiently separated upper and lower platens 211, 212 as shown in FIG. 17(c).

Figure 18:
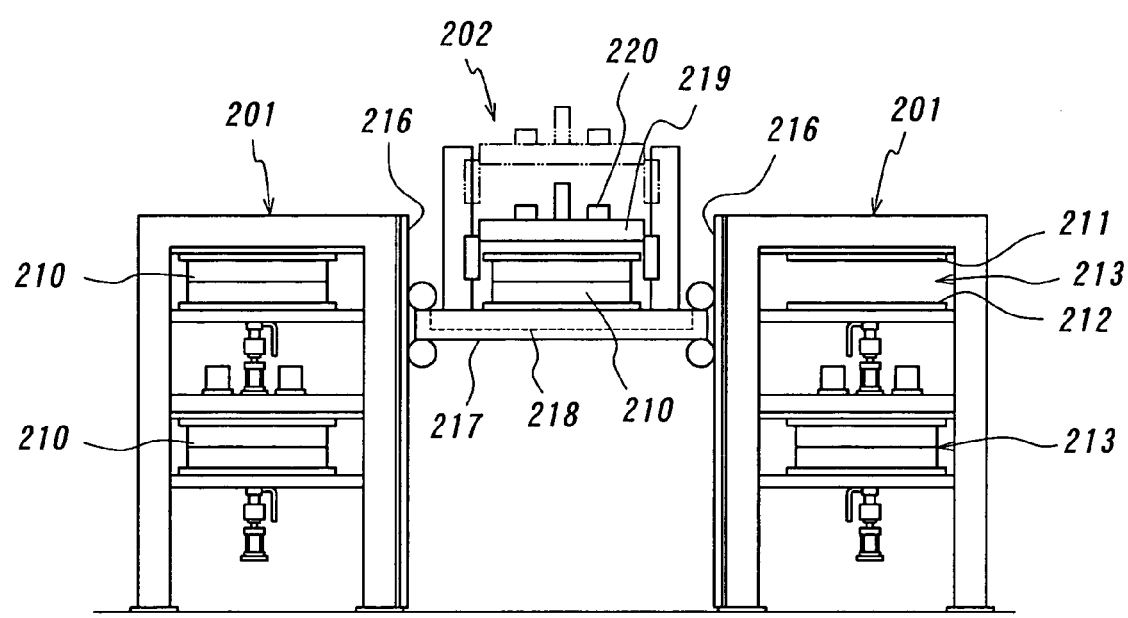
FIG. 18 is a front view showing a vulcanizing station and a mold opening/closing station.

As shown in FIG. 18, the mold opening/closing station 202 provided between two vulcanizing stations 201 is provided with: a base portion 217 to be displaced upward and downward along rising/lowering guides 216 over a height range corresponding to the vulcanizing presses 213; an advancing/retracting arm 218 as mold transferring means attached to the base portion 217 in a manner to be capable of being advanced and retracted to thereby take each vulcanizing mold 210 into and out of the associated vulcanizing press 213; an upper mold-piece lift 219 attached to the base portion itself in a manner to be capable of being raised and lowered, so as to move the upper mold-piece of the applicable vulcanizing mold 210 upward and downward to thereby open and close the vulcanizing mold 210; and upper mold-piece coupling means 220 attached to the upper mold-piece lift 219, for coupling and releasing the upper mold-piece to and from the upper mold-piece lift portion 219.

Note that the advancing/retracting arm 218 is constituted as a bidirectional advancing/retracting arm capable of being advanced and retracted in both of right and left directions in this drawing. This bidirectional advancing/retracting arm 218 is preferably constituted as a double speed mechanism, thereby enabling the singular advancing/retracting arm 218 to rapidly take the applicable vulcanizing mold 210 into and out of all the right-left symmetrically arranged vulcanizing presses 213 of the vulcanizing station 1.

Further, the rising/lowering guides 216 are mounted to common columns at opposing surfaces of both vulcanizing stations 201 so as to support the vulcanizing presses 213 of the vulcanizing stations 201, respectively, thereby enabling an integrated structure of two sets of vulcanizing stations 201 and one set of mold opening/closing station 202, to thereby enable an occupying space of the systems to be further downsized.

Each mold-opening/closing-station-aimed tire transferring apparatus 203, which is disposed at one side of the associated mold opening/closing station 202 so as to take a tire into and out of the applicable vulcanizing press 213 on the associated base portion 217, is preferably constituted of an articulation type robot, particularly multi-articulation type of robot having a swiveling arm 221, thereby effectively preventing interference of the tire transferring apparatus 203 with equipments of the neighboring stations such as by virtue of a compactly folded posture of arm portions even when the tire transferring apparatus 203 is arranged sufficiently closely to the respective stations, while ensuring a sufficient reaching distance upon usage of the tire transferring apparatus 203.

This enables transference of tires before and after vulcanization to be independently conducted at one side of the mold opening/closing station 2, irrespectively of circumstances at the other side.

Figure 19:
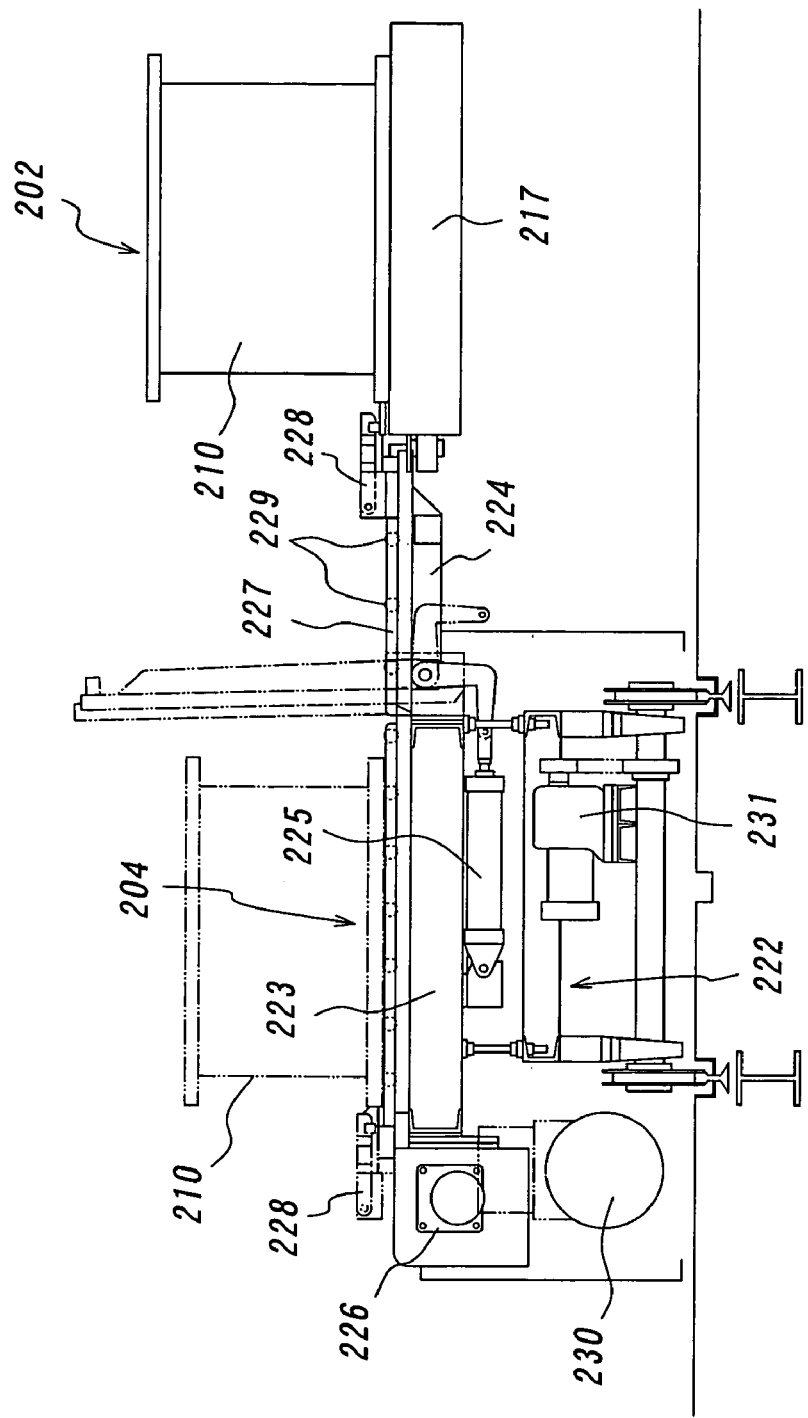
FIG. 19 is a side view illustrating a mold taking-in/out apparatus.

Further, each mold taking-in/out apparatus 204 disposed at the other side of the associated mold opening/closing station 202 and common to all the vulcanizing molds 210, is provided by a carriage, preferably a self-propelled carriage 222 which travels closely to the mold opening/closing station 202 as shown in FIG. 19.

Each mold taking-in/out apparatus 204 illustrated here can be constituted of: a taking-in/out apparatus body 223 attached to the carriage 222; a bridging member 224 hinged to the taking-in/out apparatus body 223; a cylinder 225 provided on the taking-in/out apparatus body 223, for operating the bridging member 224 between an operative posture where the bridging member 224 is bridged to the mold opening/closing station 202, for example, to the base portion 217 of a lower limit posture provided there, and an inoperative posture lifted from the operative posture by about 90°; a motor 226 mounted on the taking-in/out apparatus body 223; a chain 227 running from the taking-in/out apparatus body 223 up to the bridging member 224; an engaging member 228 attached to the chain 227 and for engaging with the applicable vulcanizing mold 213; and a plurality of guide rollers 229, preferably lifting rollers which are protruded at the surfaces only upon operation, provided over a region from the taking-in/out apparatus body 223 to the bridging member 224 so as to guide a smooth movement of the applicable vulcanizing mold 213 in the running direction of the chain 227.

In this figure, reference numeral 230 designates a compressor for generating pressurized air for operating the cylinder 225, and reference numeral 231 designates a motor for generating a driving force for the self-propelled carriage 22.

Meanwhile, such a mold taking-in/out apparatus 204 is preferably provided in two sets for one carriage 222 as shown in FIG. 14, such that one mold taking-in/out apparatus 204 is used as an empty space for receiving a used vulcanizing mold 210 via mold opening/closing station 202, and the other mold taking-in/out apparatus 204 is used as a preparatory placing space for a next-use vulcanizing mold 210, so that the vulcanizing mold 210 prepared on the other mold taking-in/out apparatus 204 can be rapidly accommodated into the mold opening/closing station 202 on the basis of a slight movement of the carriage 222 after the used vulcanizing mold 210 has been taken out of the mold opening/closing station 202.

The exchange of the vulcanizing mold 210 can be concretely conducted here, as follows. Firstly, one mold taking-in/out apparatus 4 as an empty space is brought into a posture opposing to the mold opening/closing station 2 on the basis of the movement of the carriage 222, where the bridging member 224 of the mold taking-in/out apparatus 223 is laid flat into its operative posture and the tip end of the bridging member 224 is engaged with the base portion 217 as shown in FIG. 19, thereafter the engaging member 228 attached to the chain 227 is engaged with a container, for example, of the vulcanizing mold 210 on the base portion, and the chain 227 is driven by the motor 226 to perfectly pull out the vulcanizing mold 210 onto the taking-in/out apparatus body 223 via bridging member 224 under operation of the guide rollers 229 and to position the vulcanizing mold 210 there.

After taking the used vulcanizing mold 210 out of the mold opening/closing station 202 in this way, the carriage 222 is moved in a state where the bridging member 224 is lifted to the inoperative posture represented by a virtual line in the figure and the engagement of the bridging member 224 with the base portion 217 is released, thereafter the other mold taking-in/out apparatus 204 previously placed thereon with a next-use vulcanizing mold 210 is positioned opposedly to the mold opening/closing station 202 and the bridging member 224 of this apparatus 204 is engaged with the base portion 217, and then the vulcanizing mold 210 on the apparatus body 23 is pushedly arranged onto the base portion 217 under operations of the chain 227, engaging member 228, guide rollers 229 and the like and thereafter the bridging member 224 is brought into its inoperative state.

Such exchange of vulcanizing molds 210 is to be conducted at that side of the mold opening/closing station 202 opposite to the handling area of tires without disturbing handling of tires at all, and the carriage is thereafter to run to a storing place of tires, for example, where the used vulcanizing mold 210 is unloaded exchangerably with a vulcanizing mold to be used afterwards, so as to wait for a next mold exchange.

Although there have been explained the constitution and function of the mold taking-in/out apparatus 204 shown in FIG. 19, the chain 227 as reciprocal driving means can be achieved by other known means such as cylinder, cable or the like.

Further, the post cure inflater 27 shown and disposed at the post-vulcanization treatment station 205 existent within the working area of the tire transferring apparatus 203 is to exemplarily hold one, and preferably multiple bladder-attached vulcanized tires T taken out of the vulcanizing mold 210 within the mold opening/closing station 202 by the tire transferring apparatus 203 in postures where central axes of tires become horizontal, and is to cool these tires T from at least one of inner and outer surfaces, preferably under rotation of tires T, and the tires T applied with predetermined PCI here are transported to the bladder attaching/detaching station 206 also by the tire transferring apparatus 203.

Note that each tire T after application of PCI can be directly transported to the incoming and outgoing station 207, instead of the bladder attaching/detaching station 206.

Meantime, the bladder attaching/detaching station 206 is provided with the bladder attaching/detaching apparatus 24, thereby detaching a bladder from the tire T applied with PCI, while attaching a bladder to a green tire GT before loading the green tire GT into a vulcanizing mold 210 within the mold opening/closing station 202.

Further, the incoming and outgoing station 207 illustrated and provided closely to the bladder attaching/detaching station 206 is provided with a green tire placing stand 234 for temporarily placing thereon a bladder-unattached green tire GT and a vulcanized tire placing stand 235 for temporarily placing thereon a bladder-detached vulcanized tire T, and transference of tires between the incoming and outgoing station 207 and the bladder attaching/detaching station 206 is conducted by two sets of single-purpose manipulators 208 of a swiveling arm type.

Namely, one of these manipulators 208 functions to only transport a green tire GT on the green tire placing stand 234 to the bladder attaching/detaching apparatus 24, while the other manipulator 208 functions to only transport a bladder-detached vulcanized tire T at the bladder attaching/detaching apparatus 24 onto the vulcanized tire placing stand 235.

In case of vulcanization molding a green tire GT by such a tire vulcanizing system 200, the green tire GT such as transported onto the green tire placing stand 234 of the incoming and outgoing station 207 is transported to the bladder attaching/detaching apparatus 24 by one manipulator 208, thereafter the green tire GT attached with a bladder there is loaded into a vulcanizing mold 210 within the mold opening/closing station 202 by the tire transferring apparatus 203, then the vulcanizing mold 210 is positioned and arranged within a predetermined vulcanizing press 213 on the basis of upward and downward displacements of the base portion 217 and advanced and retracted displacements of the advancing/retracting arm 218 of the mold opening/closing station 202, and thereafter the vulcanizing press 213 is operated in the above-mentioned manner to thereby conduct tightening, heating and the like of the vulcanizing mold 210.

Meanwhile, takeout of a tire after completion of vulcanization from the vulcanizing mold is conducted, by taking the vulcanizing mold 210 out of a predetermined vulcanizing press 213 under operations of the base portion 217, advancing/retracting arm 218 and the like of the mold opening/closing station 202, by opening this vulcanizing mold 210 at a required height position within the working area of the tire transferring apparatus 203 such as by the upper mold-piece lift portion 219, upper mold-piece coupling means 220 of the mold opening/closing station 202, and by transferring the bladder-containing vulcanized tire T within the vulcanizing mold 210 to the post cure inflater 27 by the tire transferring apparatus 203.

Then, the vulcanized tire T sufficiently cooled by the post cure inflater 27 is transferred to the bladder attaching/detaching apparatus 24 by the tire transferring apparatus 3 where the bladder is detached from the tire, and thereafter the tire is transported onto the vulcanized tire placing stand 235 of the incoming and outgoing station 207 by the other manipulator 208.

When the vulcanizing mold 210 within a specific vulcanizing press 213 has been fully used and is to be exchanged as a result of repeat of the above-mentioned vulcanizing process, the vulcanizing mold 210 is brought to a height position corresponding to the mold taking-in/out apparatus 204 by operations of the base portion 217, advancing/retracting arm 218 and the like of the mold opening/closing station 202 such that the restraint on the vulcanizing mold 210 is then released, and the mold taking-in/out apparatus 204 is acted on the vulcanizing mold 210 in such a state in the above-mentioned manner to thereby take out the vulcanizing mold 210 onto the mold taking-in/out apparatus 204.

On the contrary, accommodation of a next-use vulcanizing mold 210 into a specific vulcanizing press 213 can be conducted, by pushingly displacing the vulcanizing mold 210 prepared on the other mold taking-in/out apparatus 204 on the carriage 222 onto the base portion 217 in an aligned state of the mold taking-in/out apparatus 204 with the mold opening/closing station 202 on the basis of the movement of the carriage 222 and under operation of the mold taking-in/out apparatus 204, and thereafter by displacing the base portion 217 upward and downward to thereby bring the vulcanizing mold 210 to a height position corresponding to the specific vulcanizing press 213 where the vulcanizing mold 210 is advanced into the vulcanizing press 213 by operating the advancing/retracting arm 218 and the like.

Then, the used vulcanizing mold 210 taken out onto one mold taking-in/out apparatus 204 by such an exchanging operation for the vulcanizing mold 210 itself is transported to a mold storage place on the basis of running of the carriage 222.

Thus, in this tire vulcanizing system 200, each vulcanizing station 201 is provided with a plurality of levels of vulcanizing presses 213 while providing one set of mold opening/closing station 202 common to one or more sets of vulcanizing stations 201, and the tire transferring apparatus and the mold taking-in/out apparatus are disposed at one and the other sides of the mold opening/closing station 202, respectively, so that a space occupied by the system, equipment cost and the like can be effectively restricted, while allowing a remarkably improved productivity in a manner to sufficiently deal with various vulcanizing conditions, and exemplarily enabling exchange of a vulcanizing mold with an improved working efficiency without affecting transference of tires and the like while readily automatizing mold exchange and the like.

Although the vulcanizing system according to the present invention has been explained for a situation where a formed green tire GT is vulcanization molded by using a shaping bladder, this vulcanizing system is of course applicable to: a situation where a green tire is directly shaped without using a bladder; and a situation where a green tire GT is formed on a rigid core which can be disassembled and having an outer surface shape corresponding to an inner surface shape of a product tire, this green tire GT together with the rigid core is loaded into the vulcanizing mold and vulcanization molded thereby, and then the rigid core is unloaded from the vulcanized tire T after vulcanization by dis-assembling the rigid core; and in this case and in such a case where the shaping bladder specific to the vulcanizing mold is fixed or secured to the vulcanizing mold, it becomes unnecessary to provide the bladder attaching/detaching station 206 and thus the incoming and outgoing station 206 can be provided within the working area of the tire transferring apparatus 3, so that the installation of the manipulator 208 is also unnecessary. Further, it is possible to conduct attachment and detachment of bladders to and from tires even in case of a system using bladders, and in this case, the bladder attaching/detaching station 206 and manipulator 208 are also unnecessary.

Lastly, there will be explained hereinafter embodiments of a tire manufacturing method and a vulcanizing-system controlling apparatus in a related manner, to be used for the vulcanizing systems according to the first through third embodiments including the modified embodiments, on the basis of FIG. 20 and Table 1 through Table 3. Although these tire manufacturing method and vulcanizing-system controlling apparatus can be preferably applied to the vulcanizing systems according to all of the above described embodiments which are provided with multiple vulcanizing stations 2 and the vulcanizing-station-aimed tire transferring apparatus 4 common to these vulcanizing stations 2, or which are provided with the vulcanizing stations 111, 201 and the mold opening/closing station 112, 202 for opening and closing vulcanizing molds and common to these vulcanizing stations 111, 201; there will be explained hereinafter an exemplary situation where the number of vulcanizing stations 2 for one set of tire transferring apparatus 4 is modified to eight in the tire vulcanizing system 1 of the first embodiment.

TABLE 1

| Size | Vulcanizing time (minute) | | | | |
|---|---|---|---|---|---|
| | 10 | 11 | 12 | 13 | 14 |
| A | a1 | a2 | a3 | a4 | — |
| B | | b1 | b2 | b3 | b4 |
| C | | | c1 | c2 | c3 |
| D | | | | | d1 |

TABLE 2

| | allot 1 | allot 2 | allot 3 | allot 4 | | allot 80 |
|---|---|---|---|---|---|---|
| Vulcanizing station 1 | B | B | B | B | | A |
| Vulcanizing station 2 | B | B | B | B | | A |
| Vulcanizing station 3 | B | B | B | B | | A |
| Vulcanizing station 4 | B | B | B | B | ... | A |
| Vulcanizing station 5 | B | B | B | B | | A |
| Vulcanizing station 6 | B | B | B | B | | A |
| Vulcanizing station 7 | A | A | C | D | | A |
| Vulcanizing station 8 | A | C | C | C | | A |

TABLE 3

| | allot 1 | allot 2 | allot 3 | allot 4 | | allot 80 |
|---|---|---|---|---|---|---|
| Vulcanizing station 1 | b1 | b2 | b2 | b4 | | a1 |
| Vulcanizing station 2 | b1 | b2 | b2 | b4 | | a1 |
| Vulcanizing station 3 | b1 | b2 | b2 | b4 | | a1 |
| Vulcanizing station 4 | b1 | b2 | b2 | b4 | ... | a1 |
| Vulcanizing station 5 | b1 | b2 | b2 | b4 | | a1 |
| Vulcanizing station 6 | b1 | b2 | b2 | b4 | | a1 |
| Vulcanizing station 7 | a2 | a3 | c1 | d1 | | a1 |
| Vulcanizing station 8 | a2 | c1 | c1 | c3 | | a1 |
| Vulcanizing time (minute) | 11 | 12 | 12 | 14 | ... | 10 |

Table 1 shows a list of vulcanizing process for a subset of tire sizes to be produced by the tire vulcanizing system 1, per vulcanizing time. For example, prepared as vulcanizing processes corresponding to a size B are four types including a process b1 having a vulcanizing time of 11 minutes, a process b2 having a vulcanizing time of 12 minutes, a process b3 having a vulcanizing time of 13 minutes, and a process b4 having a vulcanizing time of 14 minutes.

Table 2 shows examples of size allotments, representing how the sizes are allotted to eight sets of vulcanizing stations including vulcanizing station "1" to vulcanizing station "8". Firstly, the size B is allotted to six sets of vulcanizing station "1" through vulcanizing station "6", and the size A is allotted to two sets of vulcanizing station "7" and vulcanizing station "8". This is an allotment 1. Next, in the allotment 2, the size of vulcanizing station "8" is changed over from A to C. Similarly, there is established a new allotment, whenever the size for any one of vulcanizing stations is changed over. While the intermediate allotments are omitted, all the vulcanizing stations are to conduct vulcanization of the size A in an allotment 80. Although those sizes having common vulcanizing times can be combinedly allotted, the size A and size D can not be simultaneously allotted because these sizes do not have a common vulcanizing time.

Shown in Table 3 is a manner as to which process is selected by the size A through size D allotted in each allotment. As understood therefrom, there can be sequentially selected the process having the possibly shortest vulcanizing time even for the same size, depending on the size combination of allotment, thereby enabling an enhanced productivity.

In this way, there are prepared multiple vulcanizing processes having different vulcanizing times for at least one size included in a size allotment, thereby allowing establishment of a size allotment having a vulcanizing time common to every size included in the size allotment. Further, there can be selected the shortest vulcanizing time, depending on the size combination.

Figure 20:
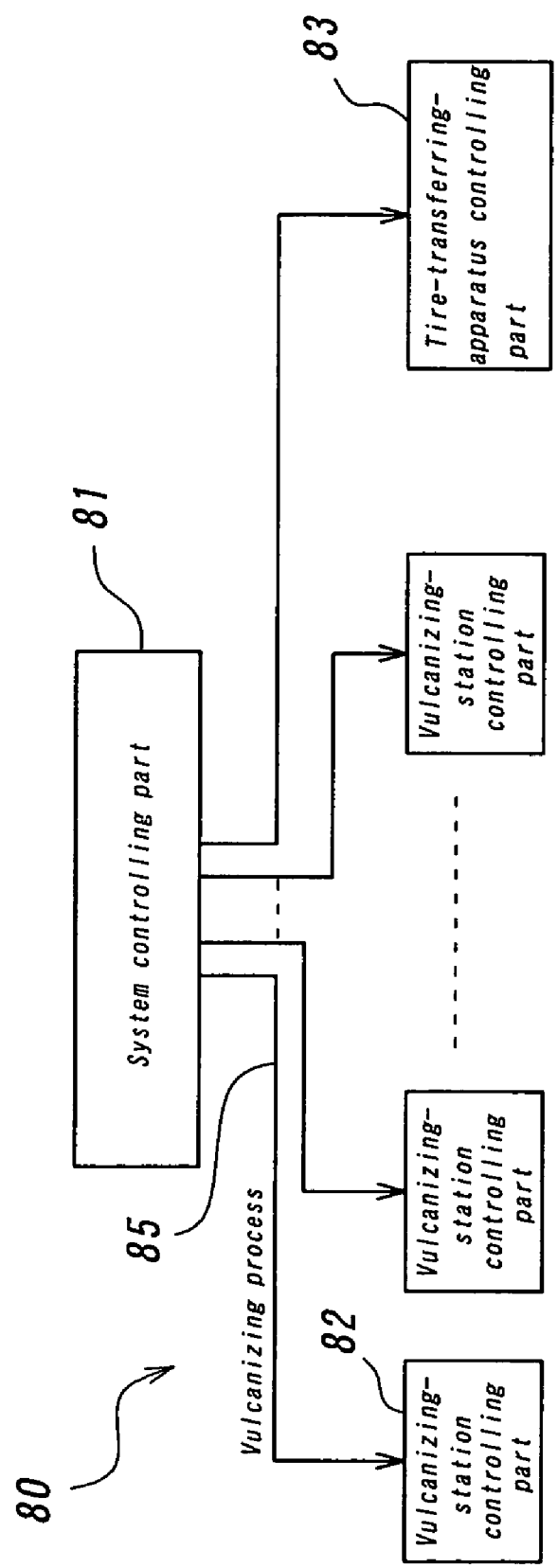
FIG. 20 is a block diagram showing a controlling apparatus.
Figure 21:
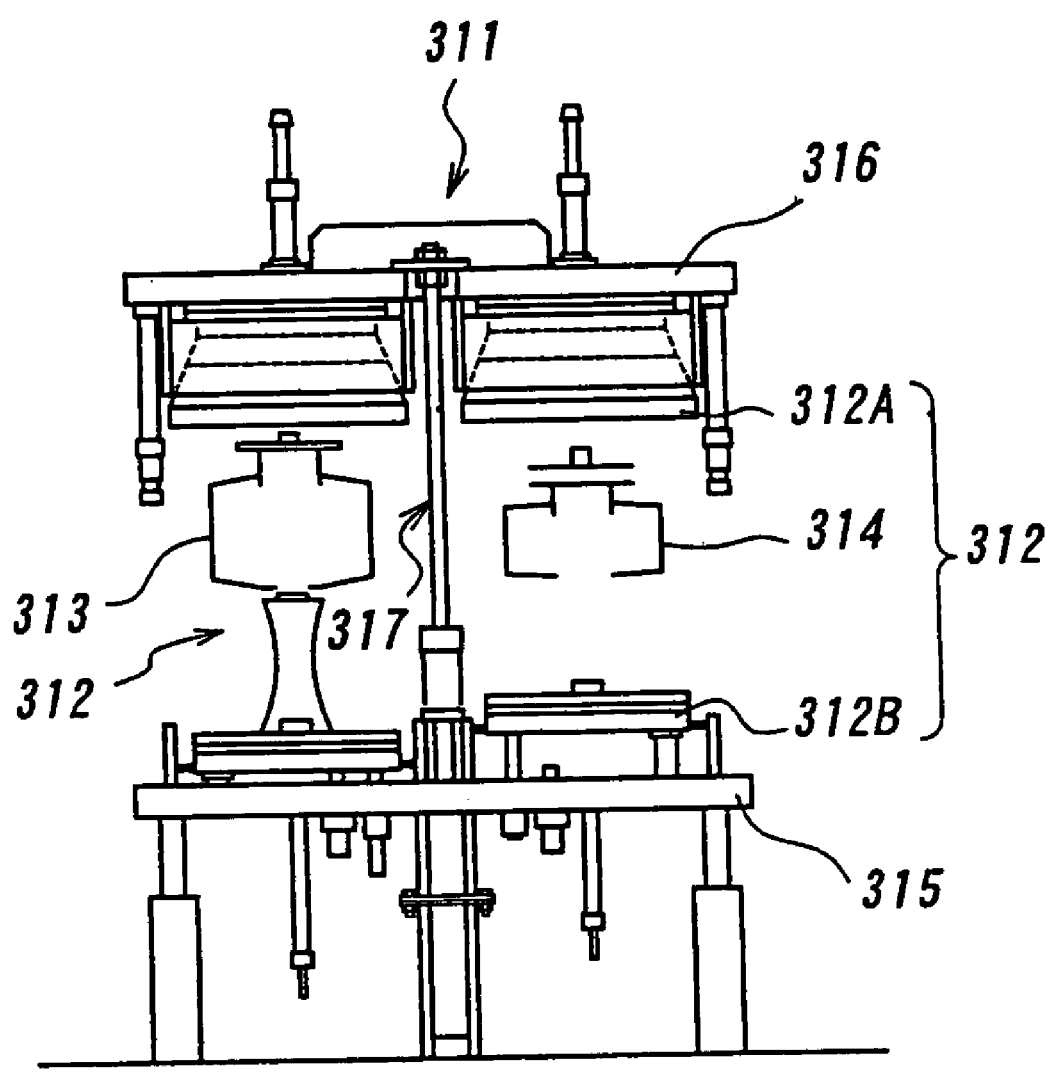
FIG. 21 is a schematic front view showing a conventional equipment.
Figure 22:
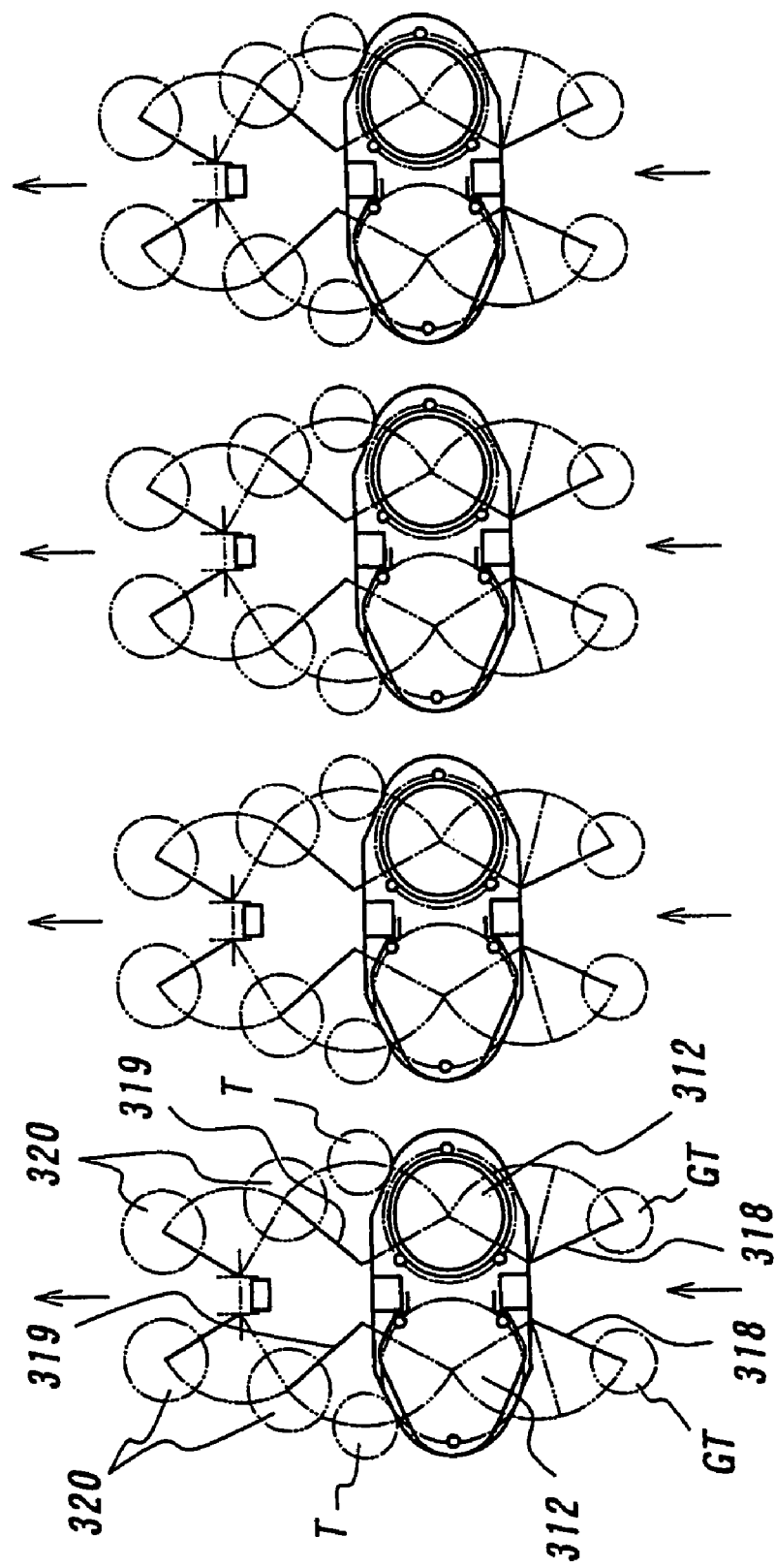
FIG. 22 is a schematic plan view illustrating a conventional vulcanizing process.

Shown in a block diagram of FIG. 20 is a controlling apparatus 80 for executing this method. Possessed at a system controlling part 81 are all pieces of information about target sizes of this vulcanizing system and all vulcanizing processes corresponding to these sizes, as well as information about size allotments. Namely, the pieces of information in Table 1 and Table 2 are possessed. These size allotments are updated conforming to an update of a production schedule, and the information therefor is inputted via input route (not shown).

Upon occurrence of size changeover in any one of the vulcanizing stations, the system controlling part 81 determines vulcanizing processes to be selected for the next size allotment and transmit the thus selected vulcanizing processes to the corresponding vulcanizing-station controlling parts 82, respectively. This is done such that, upon occurrence of changeover from the size A to the size C in the vulcanizing station "8", the vulcanizing process b2 as that for an allotment 2 is exemplarily transmitted to a vulcanizing-station controlling part 82 corresponding to the vulcanizing station "2" which has not a size changeover. Similarly transmitted to vulcanizing-station controlling parts 82 corresponding to the other vulcanizing stations are those corresponding vulcanizing processes in Table 3, respectively. Then, there is conducted vulcanization for the next size allotment, on the basis of these newly transmitted vulcanizing processes.

Although vulcanizing processes have not been conventionally changed except for the vulcanizing station where a size changeover has occurred, vulcanizing processes are required to be updated for each size allotment table in this way in the vulcanizing method of the present invention even at those vulcanizing stations without size changes, thereby making the controlling apparatus of the present invention indispensable.

Although the vulcanizing processes themselves are transmitted in this embodiment, it is possible to alternatively cause the vulcanizing-station controlling parts to previously have at least vulcanizing processes for those sizes corresponding to the vulcanizing stations, respectively, and to transmit only selecting commands thereto as to which vulcanizing processes are to be selected for the size allotments, respectively.

INDUSTRIAL APPLICABILITY

According to the present invention as apparent from the above, there is arranged a tire transferring apparatus or mold opening/closing station common to a plurality of vulcanizing stations equidistantly to these vulcanizing stations, thereby enabling a reduced equipment cost and a reduced installation space and a provision of vulcanizing system having a higher manufacturing efficiency.

The invention claimed is:

1. A tire vulcanizing system comprising a plurality of vulcanizing stations arranged on an arc within a plane and each including a vulcanizing mold and a local mold opening/closing apparatus, and one set of common vulcanizing-station-aimed tire transferring apparatus disposed at a central location of the arc and including a swiveling arm for loading a green tire into each vulcanizing mold and for unloading a vulcanized tire from each vulcanizing mold.

2. The tire vulcanizing system according to claim 1, further comprising a bladder attaching/detaching station disposed within a working area of said vulcanizing-station-aimed tire transferring apparatus and provided with a bladder attaching/detaching apparatus for attaching a bladder to a green tire and for detaching a bladder from a vulcanized tire.

3. The tire vulcanizing system according to claim 1, further comprising a post-vulcanization treatment station disposed within a working area of said vulcanizing-station-aimed tire transferring apparatus and for applying a post-vulcanization treatment to a vulcanized tire taken out of each vulcanizing mold.

4. The tire vulcanizing system according to claim 1, wherein said tire transferring apparatus is constituted of an articulation type robot.

5. The tire vulcanizing system according to claim 1, further comprising: an incoming and outgoing station including: a green tire placing stand for
    receiving a green tire from the exterior of said system to thereby temporarily store the green tire there; and a vulcanized tire placing stand for temporarily storing a vulcanized tire and
transferring it to the exterior of said system.

6. The tire vulcanizing system according to claim 5, further comprising:
    a bladder attaching/detaching station disposed within a working area of said vulcanizing station-aimed tire transferring apparatus and provided with a bladder attaching/detaching apparatus for attaching a bladder from a vulcanized tire; and
    at least one set of manipulator disposed between the bladder attaching/detaching station and the incoming/outgoing station, the manipulator transferring a tire between the bladder attaching/detaching station and the incoming and outgoing station.

7. The tire vulcanizing system according to claim 6, wherein said manipulator comprises a green-tire aimed manipulator for carrying a green tire into said bladder attaching/detaching station and a vulcanized-tire aimed manipulator for carrying a vulcanized tire out of said incoming and outgoing station, said manipulators being disposed between said incoming and outgoing station and said bladder attaching/detaching station.

8. The tire vulcanizing system according to claim 1, further comprising: a mold relaying station disposed outside the arc on which said vulcanizing stations are arranged, and disposed equidistantly to at least two of said vulcanizing stations, and a mold taking-in/out apparatus for taking a used vulcanizing mold out of each vulcanizing station to said mold relaying station and for accommodating a next-use vulcanizing mold into each vulcanizing station.

9. The tire vulcanizing system according to claim 8, wherein said mold taking-in/out apparatus is of a turntable type.

10. The tire vulcanizing system according to claim 8, wherein said mold taking-in/out apparatus is provided with a bridging member for said vulcanizing stations, and a guiding member and reciprocal driving means for said vulcanizing molds.

11. The tire vulcanizing system according to claim 8, further comprising: a carriage disposed to receive a used vulcanizing mold from said mold taking-in/out apparatus and for transferring a next-use vulcanizing mold to said mold taking-in/out apparatus.

12. The tire vulcanizing system according to claim 1, further comprising: a controlling apparatus comprising: a system controlling part for controlling the whole of said vulcanizing system, vulcanizing-station controlling parts corresponding to said vulcanizing stations, respectively, so as to at least conduct the control for executing a tire vulcanizing process, and a transmitting part for transmitting information from said system controlling part to said vulcanizing stations;

wherein upon any one of size changeovers, said transmitting part transmits information including vulcanizing processes or including commands of vulcanizing process changes, to that vulcanizing station for conducting the size changeover and additionally to other vulcanizing stations for vulcanizing tires of sizes having a plurality of vulcanizing processes, respectively.

* * * * *